United States Patent
Park et al.

(10) Patent No.: US 11,821,871 B2
(45) Date of Patent: Nov. 21, 2023

(54) GAS SENSOR, SENSOR ARRAY MODULE AND MOBILE DEVICE INCLUDING THE SAME

(71) Applicant: SAMSUNG ELECTRONICS CO., LTD., Suwon-si (KR)

(72) Inventors: Kwangmin Park, Daejeon (KR); Sihoon Lee, Yongin-si (KR); Jaeheung Lim, Suwon-si (KR); Jeongho Park, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 304 days.

(21) Appl. No.: 17/141,456

(22) Filed: Jan. 5, 2021

(65) Prior Publication Data
US 2021/0389277 A1    Dec. 16, 2021

(30) Foreign Application Priority Data

Jun. 10, 2020    (KR) .................. 10-2020-0070582

(51) Int. Cl.
    *G01N 29/02*      (2006.01)
    *G01N 29/24*      (2006.01)

(52) U.S. Cl.
    CPC ....... *G01N 29/022* (2013.01); *G01N 29/2437* (2013.01); *G01N 2291/021* (2013.01)

(58) Field of Classification Search
    CPC ............ G01N 29/022; G01N 29/2437; G01N 2291/021; G01N 29/036; G01N 29/222; G01N 29/326; G01N 2291/014; G01N 2291/0423; G01N 29/22; G01N 2291/0215; H05B 3/02; G01W 1/02
See application file for complete search history.

(56) References Cited

U.S. PATENT DOCUMENTS

| | | | |
|---|---|---|---|
| 5,992,215 A | * | 11/1999 | Caron ................. G01N 29/022 |
| | | | 73/24.01 |
| 6,955,787 B1 | | 10/2005 | Hanson |
| 7,816,681 B2 | | 10/2010 | Moon et al. |
| 8,143,681 B2 | | 3/2012 | Zaghloul et al. |

(Continued)

FOREIGN PATENT DOCUMENTS

| | | |
|---|---|---|
| JP | 2007-0132762 A | 5/2007 |
| JP | 2010-0263388 A | 11/2010 |

*Primary Examiner* — Tarun Sinha
(74) *Attorney, Agent, or Firm* — Lee IP Law, P.C.

(57) ABSTRACT

A gas sensor includes a piezoelectric substrate; a resonator in an electrode region on an upper surface of the piezoelectric substrate, the resonator including interdigital transducer (IDT) electrodes and IDT pads connected to the IDT electrodes, the IDT electrodes configured to generate a surface acoustic wave in a center region of the electrode region, the surface acoustic wave propagating in a first horizontal direction; a sensing film in the center region of the electrode region on the upper surface of the piezoelectric substrate, the sensing film including a sensing material that interacts with a target gas; and a heater in an edge region surrounding the electrode region on the upper surface of the piezoelectric substrate, the heater including heater electrodes configured to heat the sensing film and heater pads connected to the heater electrodes, the heater electrodes and the heater pads forming a closed conduction loop.

20 Claims, 32 Drawing Sheets

(56) References Cited

U.S. PATENT DOCUMENTS

| | | |
|---|---|---|
| 9,182,366 B2 | 11/2015 | Izawa et al. |
| 2006/0202590 A1 | 9/2006 | Liu et al. |
| 2007/0107522 A1* | 5/2007 | Oikawa ................ G01L 9/0025 73/754 |
| 2008/0084135 A1* | 4/2008 | Ramsesh ................... G01F 1/66 374/E11.012 |
| 2011/0057273 A1* | 3/2011 | O'Donnell ............ B81C 1/0023 438/48 |
| 2020/0132630 A1 | 4/2020 | Lee et al. |

* cited by examiner

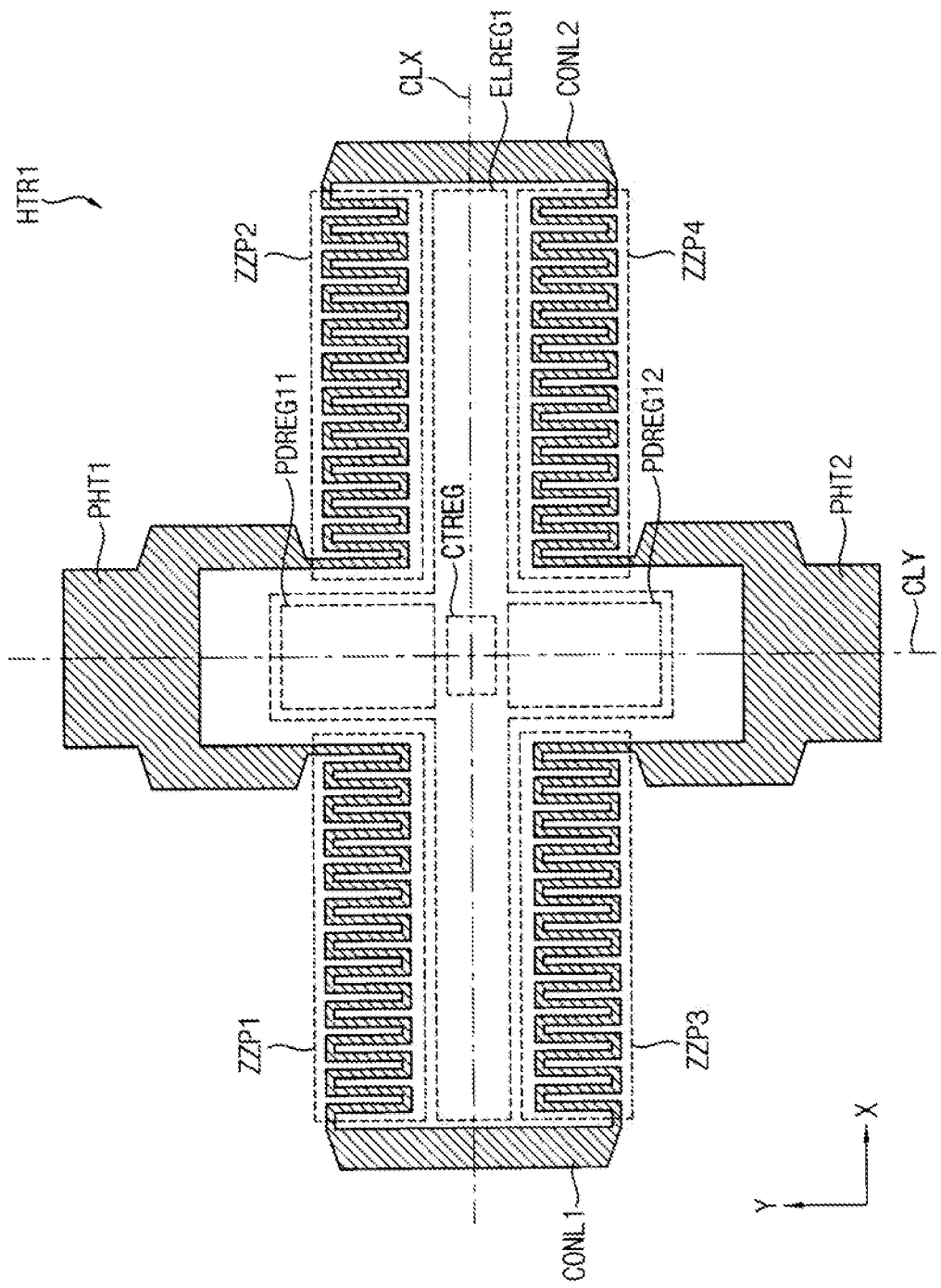

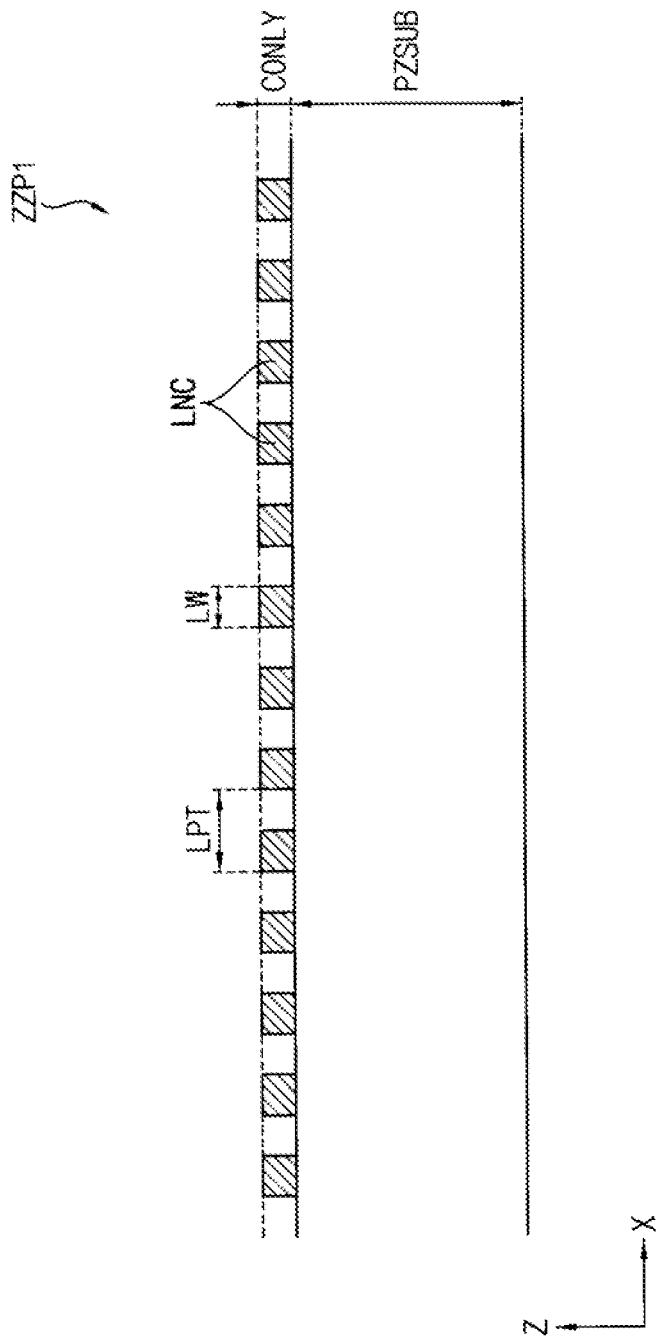

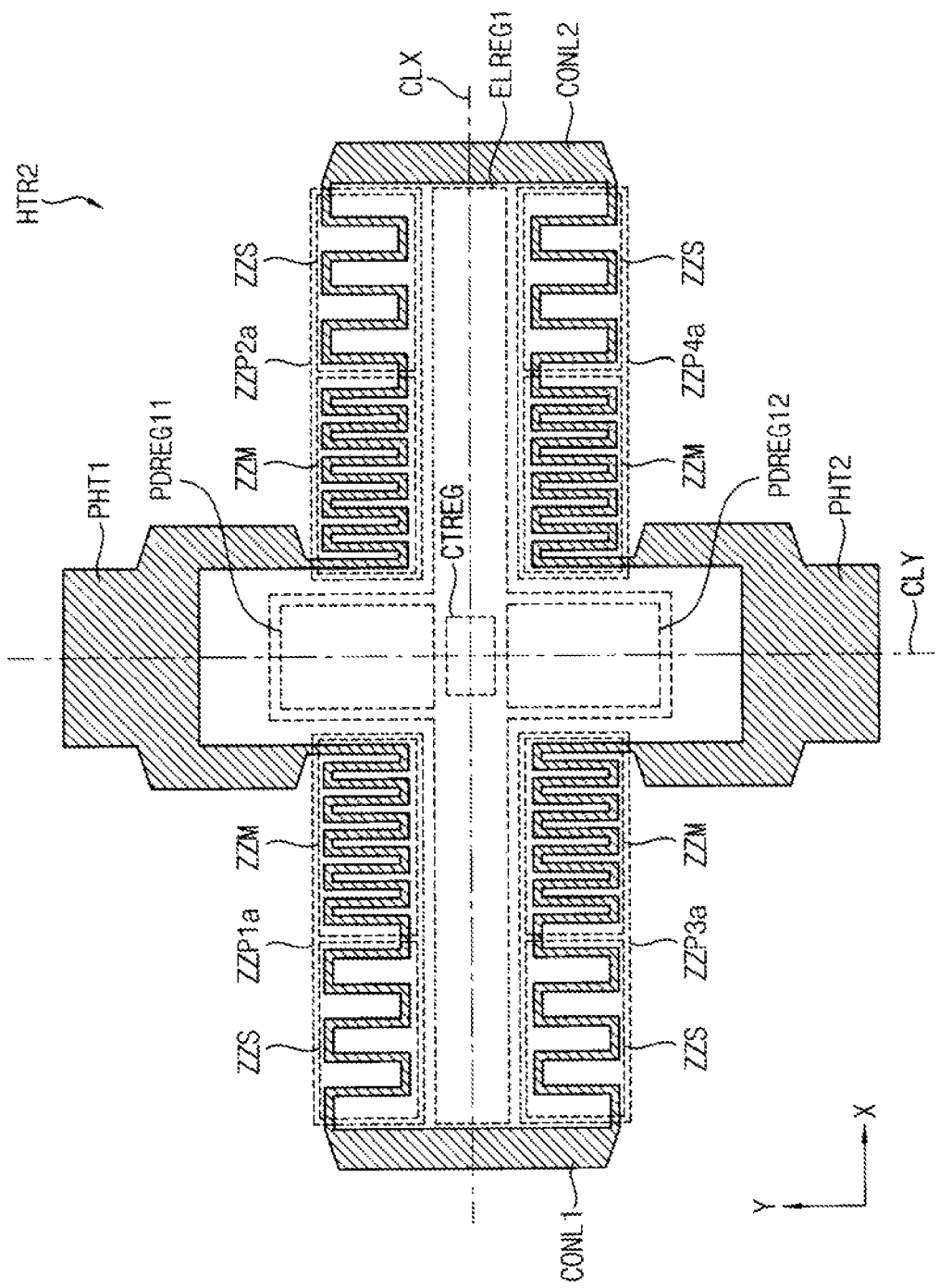

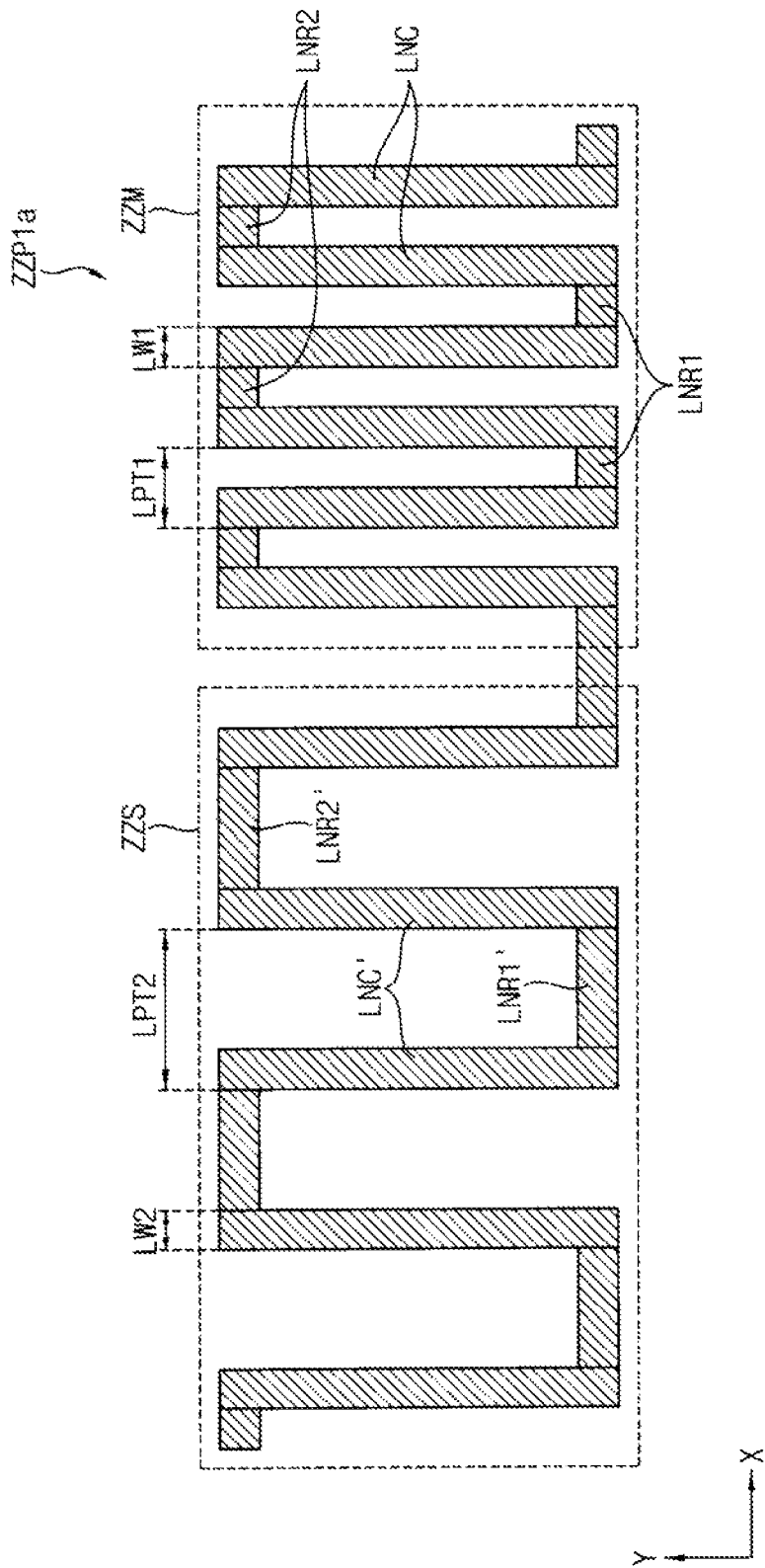

GAS SENSOR, SENSOR ARRAY MODULE AND MOBILE DEVICE INCLUDING THE SAME

CROSS-REFERENCE TO RELATED APPLICATION

Korean Patent Application No. 10-2020-0070582, filed on Jun. 10, 2020, in the Korean Intellectual Property Office, and entitled: "Gas Sensor, Sensor Array Module and Mobile Device Including the Same," is incorporated by reference herein in its entirety.

BACKGROUND

1. Field

Embodiments relate to a gas sensor, a sensor array module, and a mobile device including a gas sensor.

2. Description of the Related Art

Gas sensors may be used for various applications. For example, a gas sensor may be mounted on an air purifier, and used to measure air quality around the air purifier. Also, the gas sensor may be included in a portable device such as a mobile phone and used in order for a user of the portable device to recognize the quality of ambient air.

SUMMARY

Embodiments are directed to a gas sensor, including: a piezoelectric substrate; a resonator in an electrode region on an upper surface of the piezoelectric substrate, the resonator including interdigital transducer (IDT) electrodes and IDT pads connected to the IDT electrodes, the IDT electrodes configured to generate a surface acoustic wave in a center region of the electrode region, the surface acoustic wave propagating in a first horizontal direction; a sensing film in the center region of the electrode region on the upper surface of the piezoelectric substrate, the sensing film including a sensing material that interacts with a target gas; and a heater in an edge region surrounding the electrode region on the upper surface of the piezoelectric substrate, the heater including heater electrodes configured to heat the sensing film and heater pads connected to the heater electrodes, the heater electrodes and the heater pads forming a closed conduction loop.

Embodiments are also directed to a sensor array module, including: a base substrate; a driving circuit chip on the base substrate; and a plurality of gas sensors on the driving circuit chip. Each gas sensor of the plurality of gas sensors may include: a piezoelectric substrate; a resonator in an electrode region on an upper surface of the piezoelectric substrate, the resonator including interdigital transducer (IDT) electrodes and IDT pads connected to the IDT electrodes, the IDT electrodes configured to generate a surface acoustic wave in a center region of the electrode region, the surface acoustic wave propagating in a first horizontal direction; a sensing film in the center region of the electrode region on the upper surface of the piezoelectric substrate, the sensing film including a sensing material that interacts with a target gas; and a heater in an edge region surrounding the electrode region on the upper surface of the piezoelectric substrate, the heater including heater electrodes configured to heat the sensing film and heater pads connected to the heater electrodes, the heater electrodes and the heater pads forming a closed conduction loop.

Embodiments are also directed to a mobile device, including: a housing case including a gas entry aperture; a sensor array module including at least one gas sensor, the sensor array module being in a first internal space of the housing case; a main board in a second internal space of the housing case; a connector configured to connect the sensor array module and the main board; and a partition wall configured to block the first internal space from the second internal space. The at least one gas sensor may include: a piezoelectric substrate; a resonator in an electrode region on an upper surface of the piezoelectric substrate, the resonator including interdigital transducer (IDT) electrodes and IDT pads connected to the IDT electrodes, the IDT electrodes configured to generate a surface acoustic wave in a center region of the electrode region, the surface acoustic wave propagating in a first horizontal direction; a sensing film in the center region of the electrode region on the upper surface of the piezoelectric substrate, the sensing film including a sensing material that interacts with a target gas; and a heater in an edge region surrounding the electrode region on the upper surface of the piezoelectric substrate, the heater including heater electrodes configured to heat the sensing film and heater pads connected to the heater electrodes, the heater electrodes and the heater pads forming a closed conduction loop.

BRIEF DESCRIPTION OF THE DRAWINGS

Features will become apparent to those of skill in the art by describing in detail example embodiments with reference to the attached drawings in which:

FIG. 7 is a plan view of an example of a heater included in a gas sensor according to an example embodiment.

FIG. 8B is a cross-sectional view of a vertical structure of the zigzag pattern of FIG. 8A.

FIG. 9 is a plan view of an example of a heater included in a gas sensor according to an example embodiment.

FIG. 10A is a plan view of an example of a zigzag pattern included in the heater of FIG. 9.

DETAILED DESCRIPTION

Herein, a vertical direction Z indicates a direction perpendicular to an upper surface of a piezoelectric substrate, and a first horizontal direction X and a second horizontal direction Y indicate two directions parallel to the upper surface of the piezoelectric substrate. In the figures, a direction indicated by an arrow and the opposite direction may be considered as the same direction.

Figure 1:
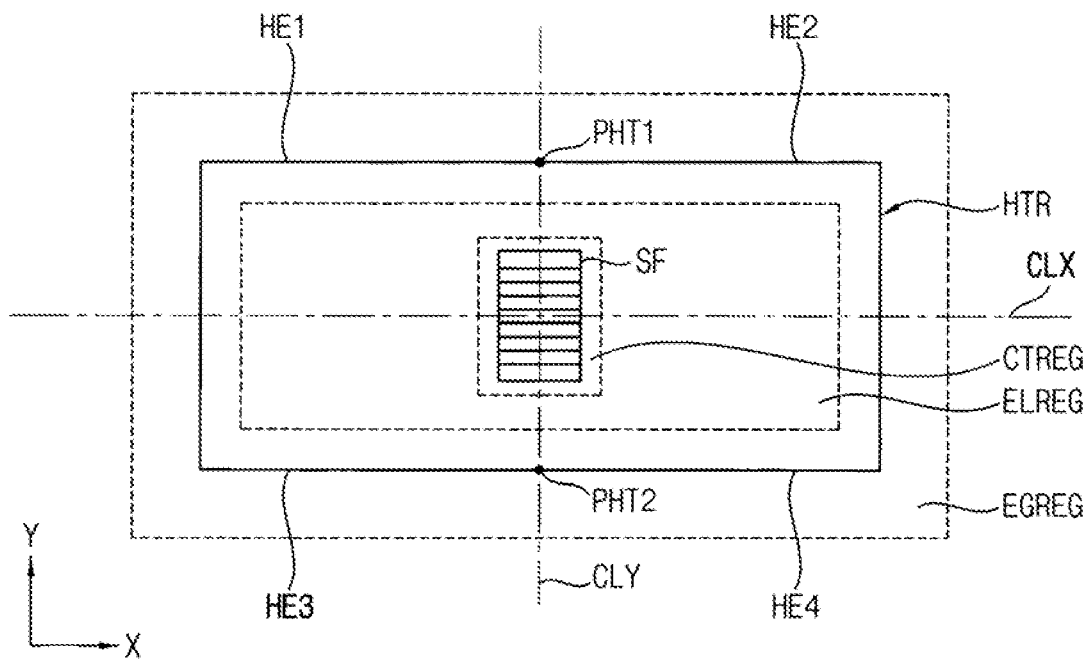
FIG. 1 is a plan view of a gas sensor according to an example embodiment.
Figure 2:
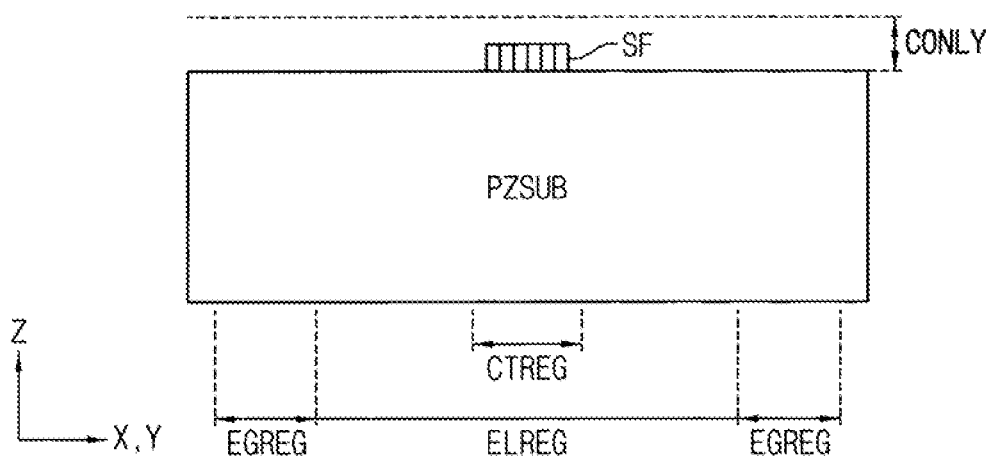
FIG. 2 is a cross-sectional view of a vertical structure of a gas sensor according to an example embodiment.

FIG. 1 is a plan view of a gas sensor according to an example embodiment, and FIG. 2 is a cross-sectional view of a vertical structure of a gas sensor according to an example embodiment.

Referring to FIGS. 1 and 2, a gas sensor 10 may include a piezoelectric substrate PZ SUB, a resonator formed in an electrode region ELREG on an upper surface of the piezoelectric substrate PZSUB, a sensing film SF formed in a center region CTREG of the electrode region ELREG on the upper surface of the piezoelectric substrate PZSUB, and a heater HTR formed in an edge region EGREG surrounding the electrode region ELREG on the upper surface of the piezoelectric substrate PZSUB.

The center region CTREG may be included in the electrode region ELREG, or the area excluding the center region CTREG may be considered as the electrode region ELREG. For convenience of illustration, the resonator is omitted in FIGS. 1 and 2, and example embodiments of the resonator will be described below with reference to FIGS. 4 and 5. In addition, for convenience of illustration, a basic structure of the heater HTR is illustrated in FIG. 1, and the heater HTR is omitted in FIG. 2. Example embodiments of the heater HTR will be described below with reference to FIGS. 7 through 21.

As will be described below with reference to FIGS. 4 and 5, the resonator formed in the electrode region ELREG may include interdigital transducer (IDT) electrodes and IDT pads connected to the IDT electrodes. The IDT electrodes may generate a surface acoustic wave (SAW) in the center region CTREG such that the SAW may propagate in the first horizontal direction X.

The sensing film SF formed in the center region CTREG on the upper surface of the piezoelectric substrate PZSUB may include a sensing material that reacts or interacts with a target gas. The sensing material included in the sensing film SF may be variously changed according to a kind of a sensed gas (i.e., a kind of the target gas). Also, a receptor of the sensing film SF may include various kinds of materials, and the resonance frequency of the resonator may be changed according to the kind or concentration of a gas sensed by the sensing film SF. For example, the sensing film SF may be implemented as a polymer.

The heater HTR formed in the edge region EGREG on the upper surface of the piezoelectric substrate PZSUB may include heater electrodes HE1~HE4 configured to heat the sensing film SF, and heater pads PHT1 and PHT2 connected to the heater electrodes HE1~HE4.

As illustrated in FIG. 2, the resonator and the heater HTR may be formed in the same conduction layer CONLY on the upper surface of the piezoelectric substrate PZSUB. Accordingly, the resonator and the heater HTR may share at least a portion of patterning processes, and thus the manufacturing cost of the heater HTR may be reduced. The heater HTR may be implemented as a conduction material, such as a metal, which has electrical conductivity or resistivity appropriate for the amount of heat to be generated by the heater HTR. In an example embodiment, the heater HTR may be implemented as the same material as wire bonding pads of the gas sensor 10.

The heater HTR included in the gas sensor 10 according to an example embodiment may have a basic structure such that the heater electrodes HE1~HE4 and the heater pads PHT1 and PHT2 may form a closed conduction loop, e.g., an electrically conductive loop of metal, etc.

The heater HTR may be symmetric with respect to a first center line CLX passing through the center region CTREG and extending in the first horizontal direction X. In addition, the heater HTR may be symmetric with respect to a second center line CLY passing through the center region CTREG and extending in the second horizontal direction Y perpendicular to the first horizontal direction Y.

As will be described with reference to FIG. 3, the heater HTR included in the gas sensor 10 according to an example embodiment may efficiently heat the sensing film SF in the center region CTREG, through the structure of the closed conduction loop and/or the symmetric structure.

In an example embodiment, as will be described below with reference to FIGS. 7 through 21, the heater HTR may include a plurality of zigzag patterns. Thus, the amount of heat per unit area of the heater HTR may be efficiently increased without increasing the size of the gas sensor 10. According to an example embodiment, the heater HTR may include a main zigzag pattern and a sub zigzag pattern respectively producing a different amount of heat per unit area. The heat generated by the heater HTR may be concentrated on the sensing film SF by disposing the main zigzag pattern (which generates the larger amount of heat per unit area) nearer to the center region CTREG than the sub zigzag pattern (which generates the lesser amount of heat per unit area).

Figure 3:
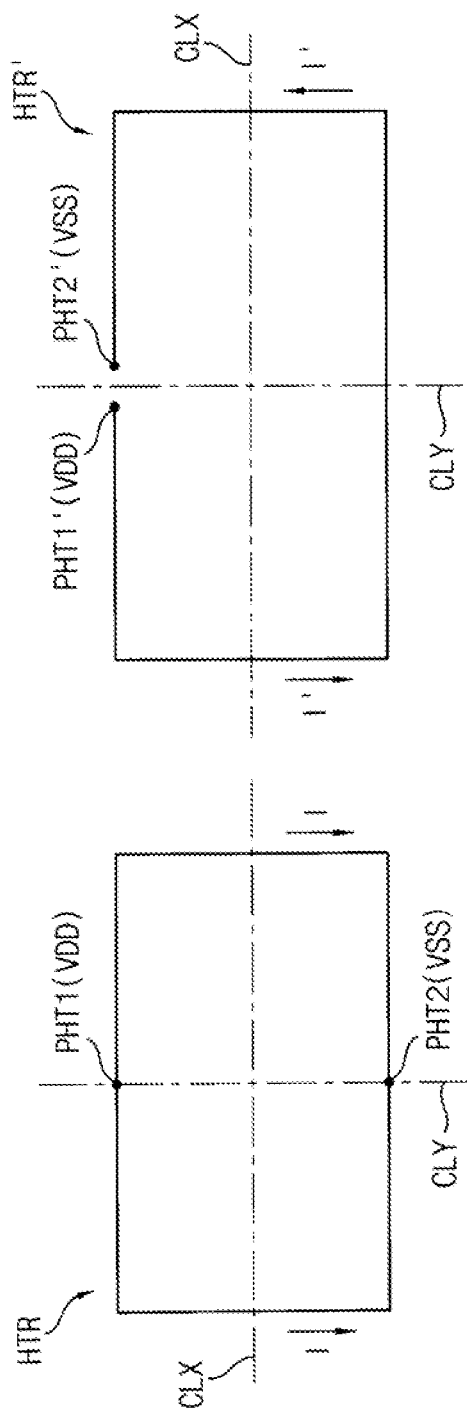
FIG. 3 is a diagram for describing a symmetric structure of a heater included in a gas sensor according to an example embodiment.

FIG. 3 is a diagram for describing a symmetric structure of a heater included in a gas sensor according to an example embodiment.

A heater HTR having a structure of a closed conduction loop according to an example embodiment is illustrated in the left portion of FIG. 3, and a heater HTR' having a structure of an open conduction loop is illustrated in the right portion of FIG. 3.

A resistance of a resistor having a uniform cross-section may be represented by Expression 1, and a power consumed as a heat per unit time may be represented by Expression 2 according to Joule's law.

$$R = L/(\sigma * S) \quad \text{Expression 1}$$

$$P = I^2 * R \quad \text{Expression 2}$$

In Expression 1, R indicates a resistance of a resistor, L indicates a length of the resistor, S indicates a cross-sectional area of the resistor, and σ indicates a conductivity of the resistor. In Expression 2, P indicates a power, R indicates a resistance of a resistor, and I indicates a current flowing through the cross-sectional area of the resistor.

When a power supply voltage VDD is applied to a first heater pad PHT1 of the heater HTR and a ground voltage VSS is applied to a second heater pad PHT2 of the heater HTR, the same current I may flow clockwise and counter clockwise from the first heater pad PHT1 to the second heater pad PHT2, due to the structure, e.g., the symmetry, of the closed conduction loop. If the resistance of each of the two conduction paths from the first heater pad PHT1 to the second heater pad PHT2 is R, a power P1 of the heater HTR may be represented by Expression 3.

$$P1=I^2*R+I^2*R=2*I^2*R \qquad \text{Expression 3}$$

In contrast, the heater HTR' of the open conduction loop has a single conduction path from the first heater pad PHT1' to the second heater pad PHT2', and the resistance of the single conduction path is 2*R. Thus, the current I' flowing through the open conduction loop of the heater HTR' is half the current flowing through the closed conduction loop of the heater HTR and a power P2 of the heater HTR' may be represented by Expression 4.

$$P2=(I/2)^2*(2*R)=(\tfrac{1}{2})*I^2*R=P1/4 \qquad \text{Expression 4}$$

As a result, when the same heating voltages VDD and VSS are used, the heater HTR having the closed conduction loop may generate heat in an amount that is four times the amount of heat of the heater HTR' having the open conduction loop. Thus, the heater HTR according to an example embodiment may heat the sensing film SF efficiently.

Figure 4:
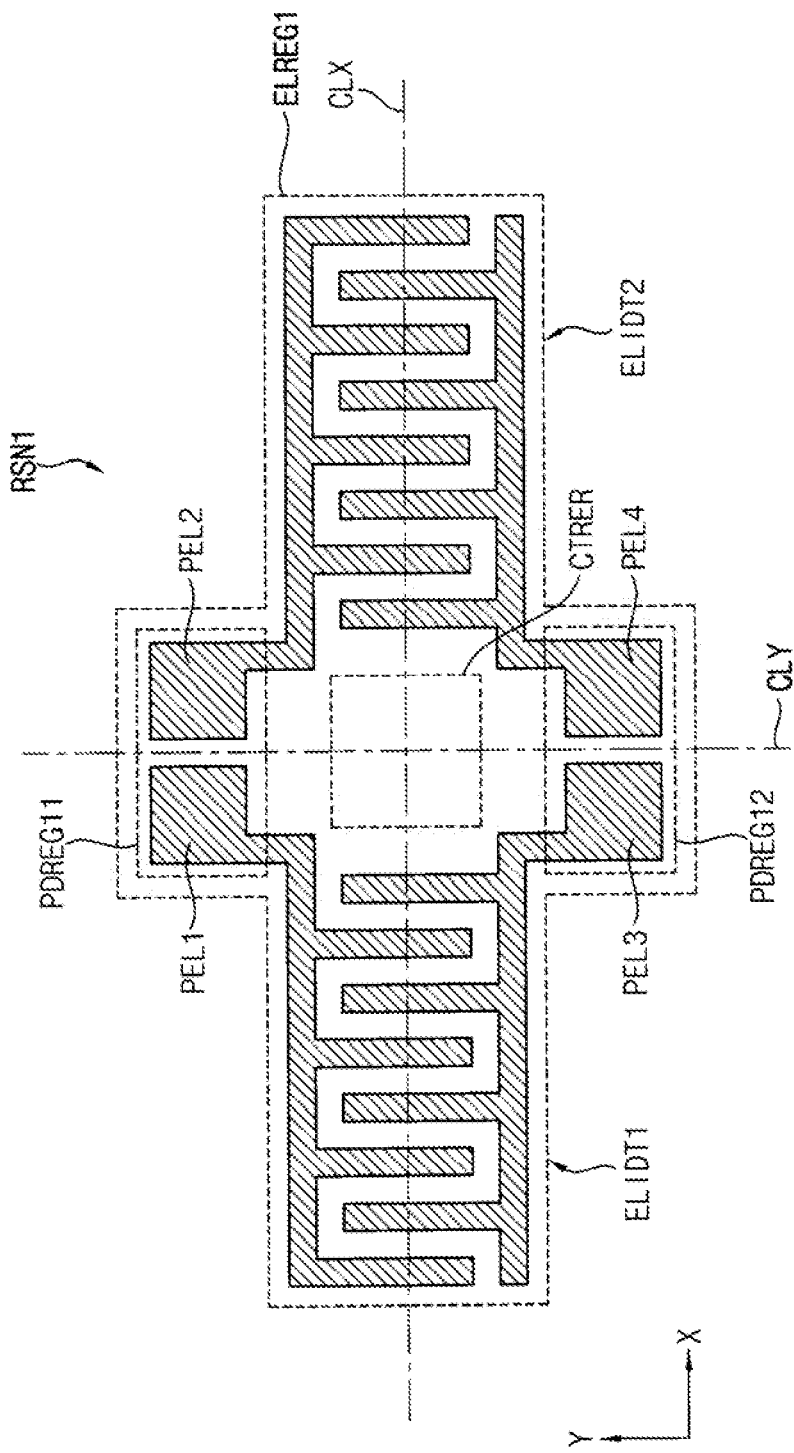
FIGS. 4 and 5 are plan views of examples of a resonator included in a gas sensor according to example embodiments.
Figure 5:
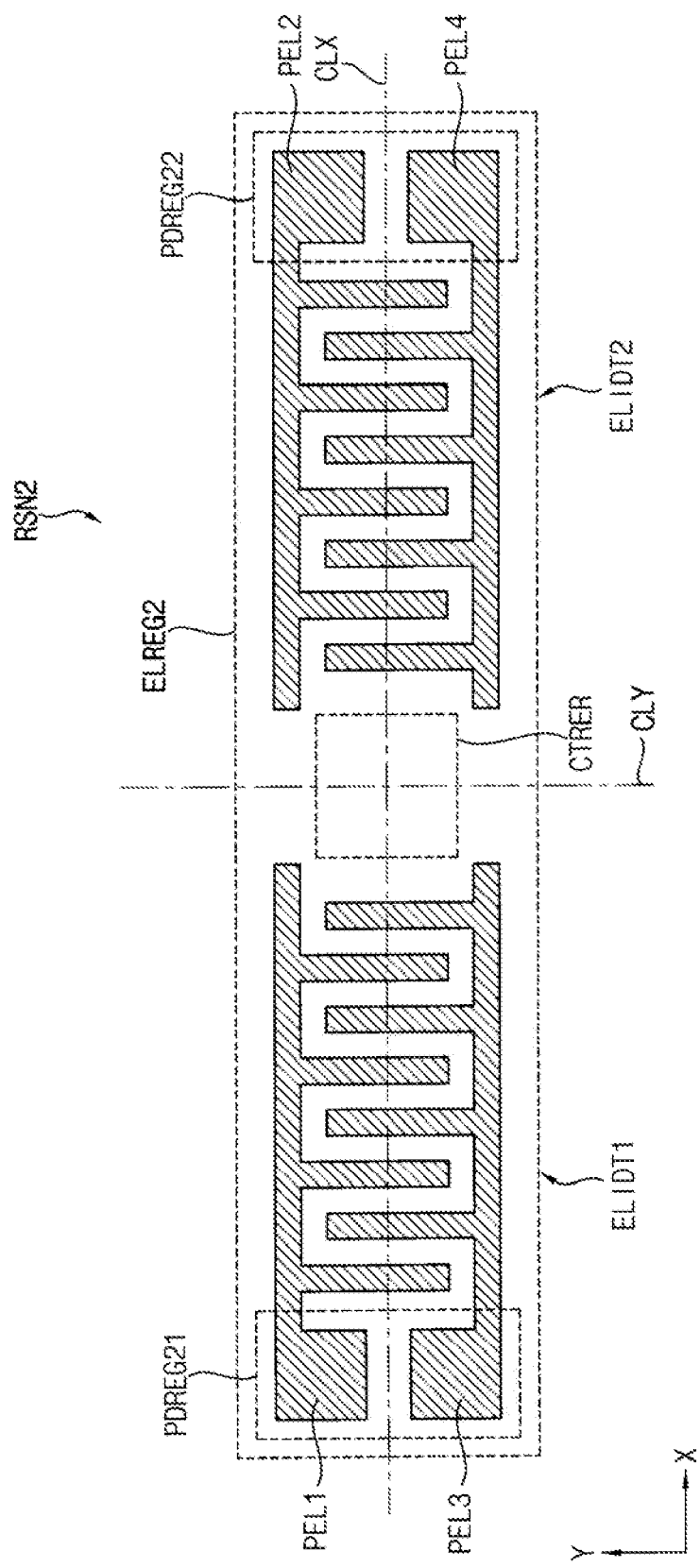

FIGS. 4 and 5 are plan views of example embodiments of a resonator included in a gas sensor according to an example embodiment.

Referring to FIGS. 4 and 5, each of resonators RSN1 and RSN2 may include IDT electrodes ELIDT1 and ELIDT2, and IDT pads PEL1~PEL2.

Each of the IDT electrodes ELIDT1 and ELID2 may include interlocked comb-shaped electrodes, as illustrated in FIGS. 4 and 5. The electrodes may be deposited on the surface of the piezoelectric substrate to form a periodic structure. An input signal or voltage applied to at least one of the IDT pads PEL1~PEL4 may cause a mechanical force through piezoelectric effect, and thus the input signal may be converted to a surface acoustic wave (SAW) propagating in the first horizontal direction X in the upper portion of the piezoelectric substrate. The SAW may be converted again to an output signal or voltage that is provided through at least one of the IDT pads PEL1~PEL4.

A frequency of the SAW is affected by a material deposited on the propagation surface of the piezoelectric substrate, as represented by Expression 5.

$$\Delta f=k*(\Delta m*fo^2)/A \qquad \text{Expression 5}$$

In Expression 5, $\Delta f$ indicates a frequency shift, k indicates a constant depending on the gas sensor, A indicates a propagation area of the SAW, $\Delta m$ indicates mass loading of the material deposited on the propagation surface, and fo indicates a resonance frequency of the resonator.

The frequency shift is increased as the more target gas is combined with the sensing material of the sensing film SF in the center region CTREG. Accordingly, the density of the target gas may be determined by measuring the frequency shift.

In an example embodiment, as illustrated in FIG. 4, the IDT pads PEL1~PEL4 may be disposed in a first pad region PDREG11 and a second pad region PDREG12 where the first pad region PDREG11 and the second pad region PDREG12 are adjacent to both, e.g., opposite, sides of the center region CTREG along the second center line CLY. In this case, the electrode region ELREG1 may have a cross shape when viewed from the vertical direction Z perpendicular to the upper surface of the piezoelectric substrate.

In an example embodiment, as illustrated in FIG. 5, the IDT pads PEL1~PEL4 may be disposed in a first pad region PDREG21 and a second pad region PDREG22, the first pad region PDREG21 and the second pad region PDREG22 corresponding to both, e.g., opposite, end portions of the electrode region ELREG2 along the first center line CLX. In this case, the electrode region ELREG2 has a rod shape extending in the first horizontal direction X when viewed from the vertical direction Z perpendicular to the upper surface of the piezoelectric substrate.

Example embodiments may be varied from the examples of the SAW resonators of FIGS. 4 and 5. The shape of the heater HTR included in the gas sensor according to an example embodiment may be modified adaptively depending on the shape of the electrode region.

Figure 6:
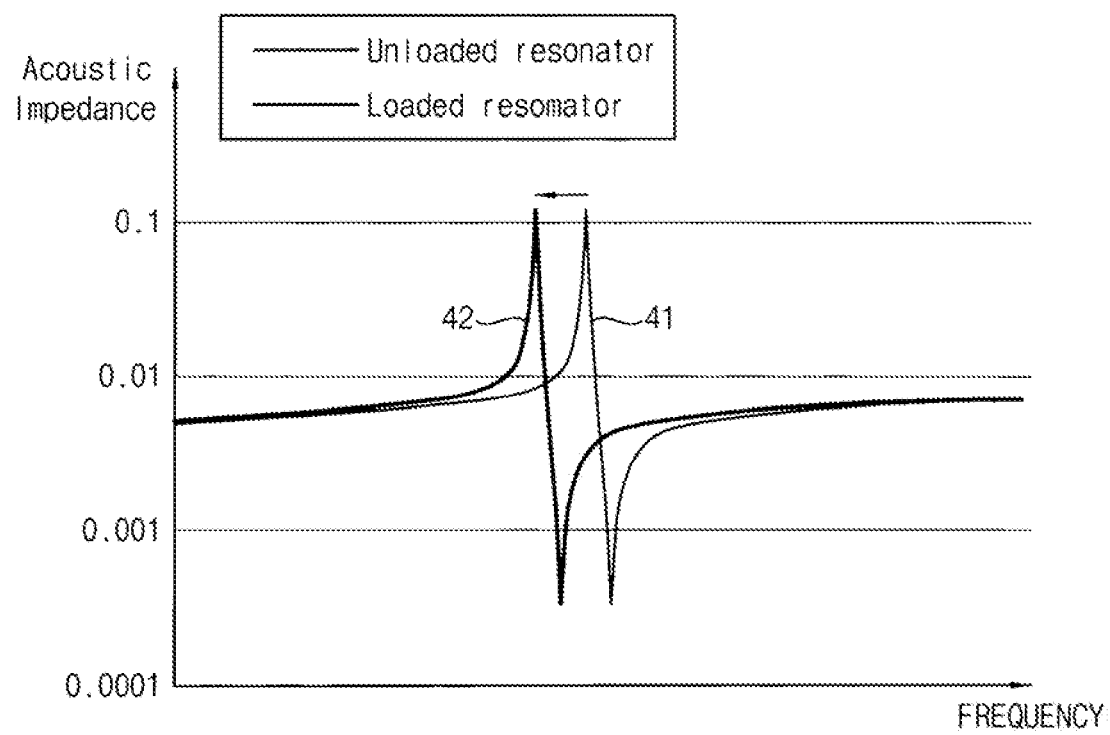
FIG. 6 is a diagram illustrating variation in a resonance frequency of a gas sensor according to loading.

FIG. 6 is a diagram illustrating variation in a resonance frequency of a gas sensor according to loading.

In FIG. 6, the horizontal axis represents a frequency and the vertical axis represents acoustic impedance. A first curve 41 shows a resonance frequency of the gas sensor when target gas molecules are not sensed by the sensing film (i.e., the resonance frequency of the unloaded resonator). A second curve 42 shows a resonance frequency of the gas sensor when target gas molecules are sensed by the sensing film (i.e., the resonance frequency of the loaded resonator). When the target gas molecules are sensed by the sensing film, the resonance frequency of the gas sensor may be changed, so that the frequency of the output signal of the resonator may be changed. Accordingly, the target gas may be sensed or measured by detecting the frequency shift of the output signal of the resonator.

FIG. 7 is a plan view of an example embodiment of a heater included in a gas sensor according to an example embodiment.

FIG. 7 illustrates an example embodiment of a heater HTR1 corresponding to the electrode region ELREG1 having a cross shape as illustrated in FIG. 4. In other words, the IDT pads PEL1~PEL4 may be disposed in the first pad region PDREG11 and the second pad region PDREG12 where the first pad region PDREG11 and the second pad region PDREG12 are adjacent to both, e.g., opposite, sides of the center region CTREG along the second center line CLY.

Referring to FIG. 7, the heater HTR1 may include first through fourth zigzag patterns ZZP1~ZZP4 (corresponding to heater electrodes), a first heater pad PHT1, and a second heater pad PHT2.

The first heater pad PHT1 and the second heater pad PHT2 are respectively disposed adjacent to a side of the first pad region PDREG11 along the second center line CLY and a side of the second pad region PDREG12 along the second center line CLY.

The first and second zigzag patterns ZZP1 and ZZP2 may be disposed adjacent to both, e.g., opposite, sides of the first pad region PDREG11 in the first horizontal direction X. The third and fourth zigzag patterns ZZP3 and ZZP4 may be disposed adjacent to both, e.g., opposite, sides of the second pad region PDREG12 in the first horizontal direction. The first zigzag pattern ZZP1 may be connected to the third zigzag pattern ZZP3 through a first connection conduction line CONL1. The second zigzag pattern ZZP2 may be connected to the fourth zigzag pattern ZZP4 through a second connection conduction line CONL2.

As such, the first through fourth zigzag patterns ZZP1~ZZP4, the first heater pad PHT1, and the second heater pad PHT2 included in the heater HTR1 may form a closed conduction loop, and may be symmetric with respect to each of the first center line CLX and the second center line CLY.

Figure 8A:
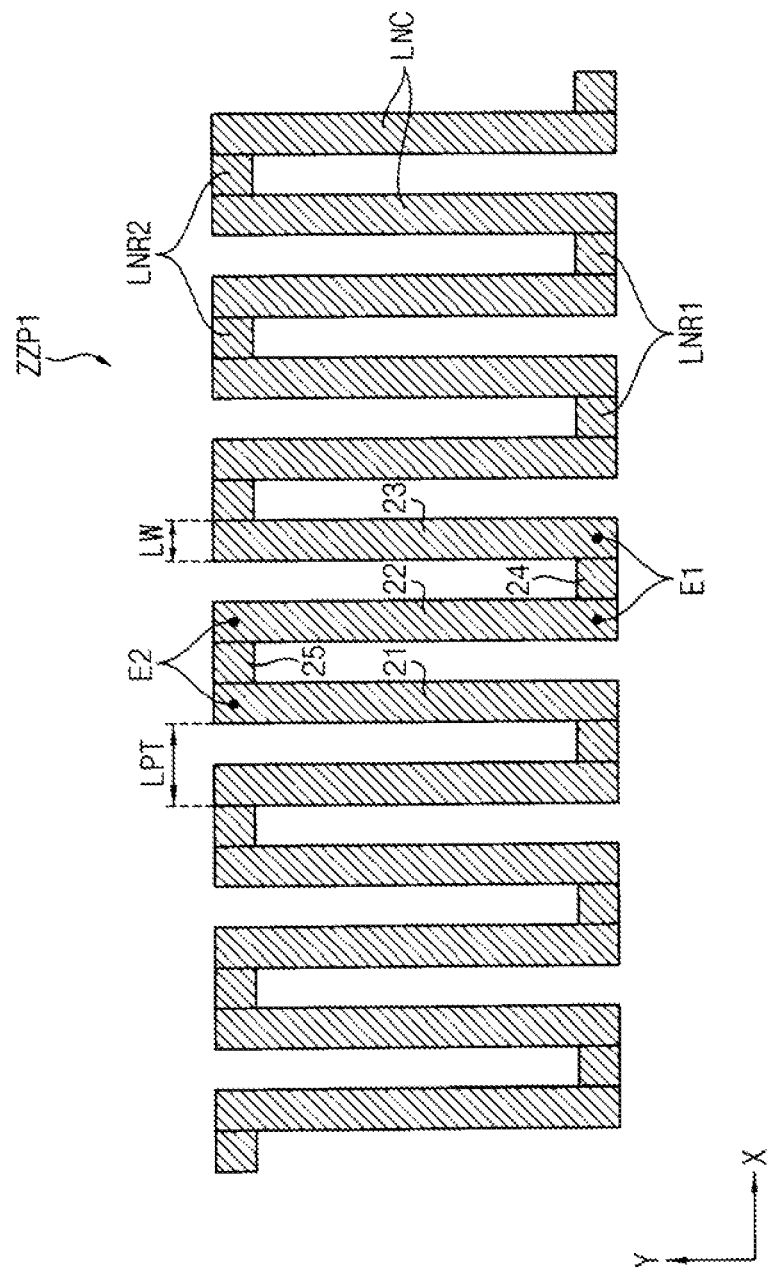
FIG. 8A is a plan view of an example of a zigzag pattern included in the heater of FIG. 7.

FIG. 8A is a plan view of an example embodiment of a zigzag pattern included in the heater of FIG. 7, and FIG. 8B is a cross-sectional view of a vertical structure of the zigzag pattern of FIG. 8A.

Only the first zigzag pattern ZZP1 is illustrated in FIGS. 8A and 8B for convenience of illustration. It will be understood that, in the symmetric structure of the heater HTR1, the structures of the second through fourth zigzag patterns ZZ2~ZZ4 may be implemented substantially the same as the first zigzag pattern ZZP1.

Referring to FIGS. 8A and 8B, the first zigzag pattern ZZP1 may include a plurality of column conduction lines LNC, a plurality of first row conduction lines LNR1 and a plurality of second row conduction lines LNR2.

The column conduction lines LNC may extend in the second horizontal direction Y, and may be arranged, e.g., spaced apart, in the first horizontal direction X. The first row conduction lines LNR1 may connect first ends E1 of the column conduction lines LNC. The second row conduction lines LNR2 may connect second ends E2 of the column conduction lines LNC.

To form the zigzag pattern ZZP1, a first row conduction line LNR1 may connect a first end E1 of a first column conduction line LNC to a first end E1 of an adjacent second column conduction line LNC, and a second row conduction line LNR2 may connect a second end E2 of the adjacent second column conduction line LNC to a second end E2 of an adjacent third column conduction line LNC.

For example, referring to FIG. 8A, the zigzag pattern ZZP1 may include three column conduction lines 21, 22, and 23 that are sequentially adjacent in the first horizontal direction X. The first ends E1 of the center column conduction line 22 and the right column conduction line 23 may be connected through one first row conduction line LNR1. The second ends E2 of the center column conduction line 22 and the left column conduction line 21 may be connected through one second row conduction line LNR2.

The amount of heat per unit area of the heater HTR1 may be increased due to the zigzag pattern.

In an example embodiment, as illustrated in FIGS. 8A and 8B, a line pitch LTP in the first horizontal direction X between two adjacent column conduction lines may be uniform with respect to all of the column conduction lines included in the first zigzag pattern ZZP1. In addition, a line width LW of the column conduction line may be uniform with respect to all of the column conduction lines included in the first zigzag pattern ZZP1. As a result, the first zigzag pattern ZZP1 may generate a uniform amount of heat per unit area.

FIG. 9 is a plan view of an example embodiment of a heater included in a gas sensor according to an example embodiment.

FIG. 9 illustrates an example embodiment of a heater HTR2 corresponding to the electrode region ELREG1 having a cross shape as illustrated in FIG. 4. In other words, the IDT pads PEL1~PEL4 may be disposed in the first pad region PDREG11 and the second pad region PDREG12, the first pad region PDREG11 and the second pad region PDREG12 being adjacent to both, e.g., opposite, sides of the center region CTREG along the second center line CLY.

Referring to FIG. 9, the heater HTR2 may include first through fourth zigzag patterns ZZP1a~ZZP4a (corresponding to heater electrodes), a first heater pad PHT1, and a second heater pad PHT2.

The first heater pad PHT1 and the second heater pad PHT2 are respectively disposed adjacent to a side of the first pad region PDREG11 along the second center line CLY and a side of the second pad region PDREG12 along the second center line CLY.

The first and second zigzag patterns ZZP1a and ZZP2a may be disposed adjacent to both, e.g., opposite, sides of the first pad region PDREG11 in the first horizontal direction X. The third and fourth zigzag patterns ZZP3a and ZZP4a may be disposed adjacent to both, e.g., opposite, sides of the second pad region PDREG12 in the first horizontal direction. The first zigzag pattern ZZP1a may be connected to the third zigzag pattern ZZP3a through a first connection conduction line CONL1. The second zigzag pattern ZZP2a may be connected to the fourth zigzag pattern ZZP4a through a second connection conduction line CONL2.

As such, the first through fourth zigzag patterns ZZP1~ZZP4, the first heater pad PHT1, and the second heater pad PHT2 included in the heater HTR2 may form a closed conduction loop, and may be symmetric with respect to each of the first center line CLX and the second center line CLY.

Each of the first through fourth zigzag patterns ZZP1a~ZZP4a may include a main zigzag pattern ZZM and a sub zigzag pattern ZZS. The main zigzag pattern ZZM may be disposed adjacent to the center region CTREG, and the main zigzag pattern ZZM may generate a first amount of heat per unit area. The sub zigzag pattern ZZS may be disposed farther from the center region CTREG than the main zigzag pattern ZZM, and the sub zigzag pattern ZZS may generate a second amount of heat per unit area, the second amount of heat per unit area being less than the first amount of heat per unit area.

In an example embodiment, as will be described with reference to FIGS. 10A through 11B, the different heat amounts per unit area of the main zigzag pattern ZZM and the sub zigzag pattern ZZS may be implemented by differentiating a line pitch between the column conduction lines in the main zigzag pattern ZZM and a line pitch between the column conduction lines in the sub zigzag pattern ZZS.

In an example embodiment, as will be described with reference to FIGS. 11A and 11B, the different heat amounts per unit area of the main zigzag pattern ZZM and the sub zigzag pattern ZZS may be implemented by differentiating a line width of the column conduction lines in the main zigzag pattern ZZM and a line width of the column conduction lines in the sub zigzag pattern ZZS.

As such, the heat generated by the heater HTR2 may be concentrated on the sensing film SF disposed in the center region CTREG to reduce power consumption by disposing the main zigzag pattern (generating the larger amount of heat per unit area) nearer to the center region CTREG than the sub zigzag pattern (generating the less amount of heat per unit area).

Figure 10B:
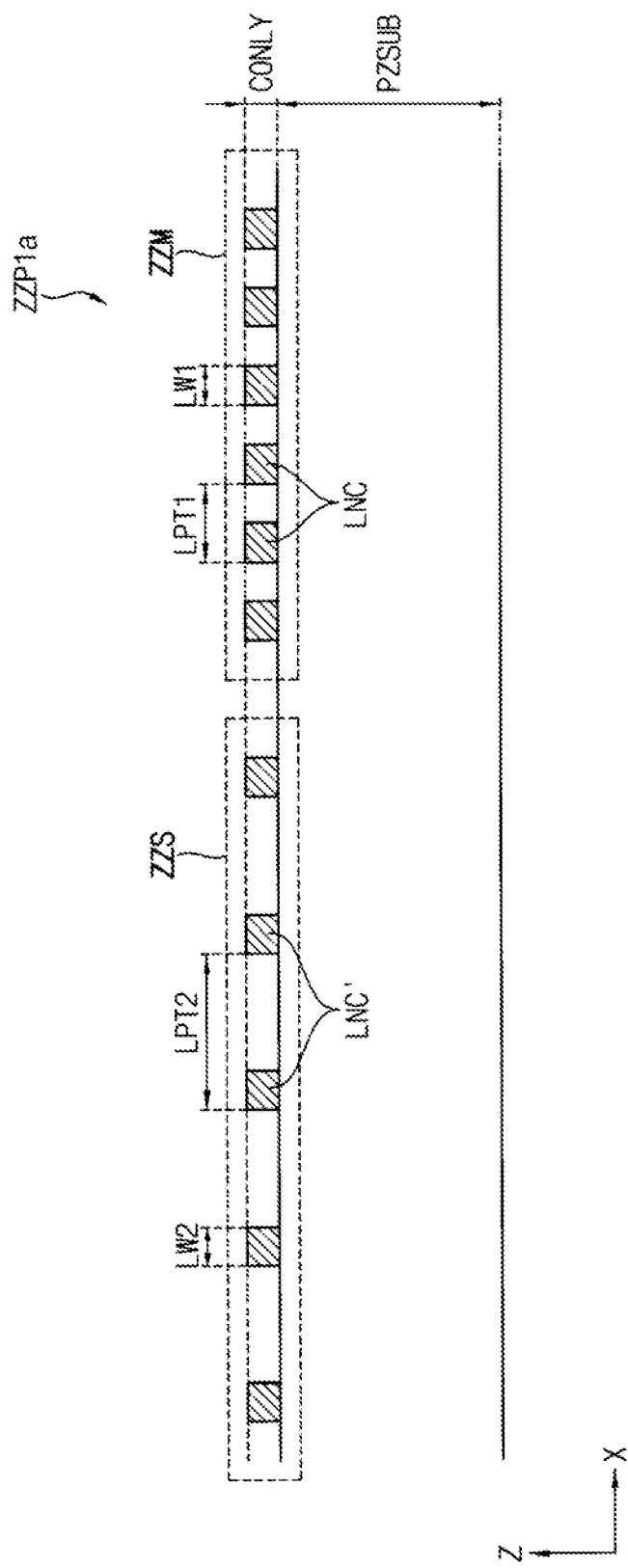
FIG. 10B is a cross-sectional view of a vertical structure of the zigzag pattern of FIG. 10A.

FIG. 10A is a plan view of an example embodiment of a zigzag pattern included in the heater of FIG. 9, and FIG. 10B is a cross-sectional view of a vertical structure of the zigzag pattern of FIG. 10A.

Only the first zigzag pattern ZZP1a is illustrated in FIGS. 10A and 10B for convenience of illustration. It will be understood that, in the symmetric structure of the heater HTR2, the structures of the second through fourth zigzag patterns ZZ2a~ZZ4a may be implemented substantially the same as the first zigzag pattern ZZP1a.

Referring to FIGS. 10A and 10B, the first zigzag pattern ZZP1a may include the main zigzag pattern ZZM and the sub zigzag pattern ZZS. The zigzag structure of the column conduction lines and the row conduction lines in main zigzag pattern ZZM and the sub zigzag pattern ZZS is substantially the same as described with reference to FIGS. 8A and 8B, and the repeated descriptions are omitted.

As illustrated in FIGS. 10A and 10B, a first line pitch LPT1 in the first horizontal direction X of two adjacent column conduction lines LNC included in the main zigzag pattern ZZM may be smaller than a second line pitch LPT2 in the first horizontal direction X of two adjacent column conduction lines LNC' included in the sub zigzag pattern ZZS.

A line width LW1 of the column conduction lines LNC included in the main zigzag pattern ZZM may be equal to a line width of the column conduction lines LNC' included in the sub zigzag pattern ZZS.

A length in the first horizontal direction X of the row conduction lines LNR1' and LNR2' included in the sub zigzag pattern ZZS may be longer than a length in the first horizontal direction X of the row conduction lines LNR1 and LNR2 included in the main zigzag pattern ZZM, because the second line pitch LPT2 is greater than the first line pitch LPT1.

As the line pitch is increased, the length of the current path per unit area is decreased, and thus the resistance per unit area may be decreased by Expression 1. In addition, as the resistance per unit area is decreased, the amount of heat per unit area may be decreased by Expression 2. As a result, the first amount of heat per unit area of the main zigzag pattern ZZM may be larger than the second amount of heat per unit area of the sub zigzag pattern ZZS, because the first line pitch LPT1 is smaller than the second line pitch LPT2.

As such, the heat generated by the heater HTR2 may be concentrated on the sensing film SF disposed in the center region CTREG to reduce power consumption of the gas sensor by disposing the main zigzag pattern ZZM (generating the larger amount of heat per unit area) nearer to the center region CTREG than the sub zigzag pattern ZZS (generating the less amount of heat per unit area).

Figure 11A:
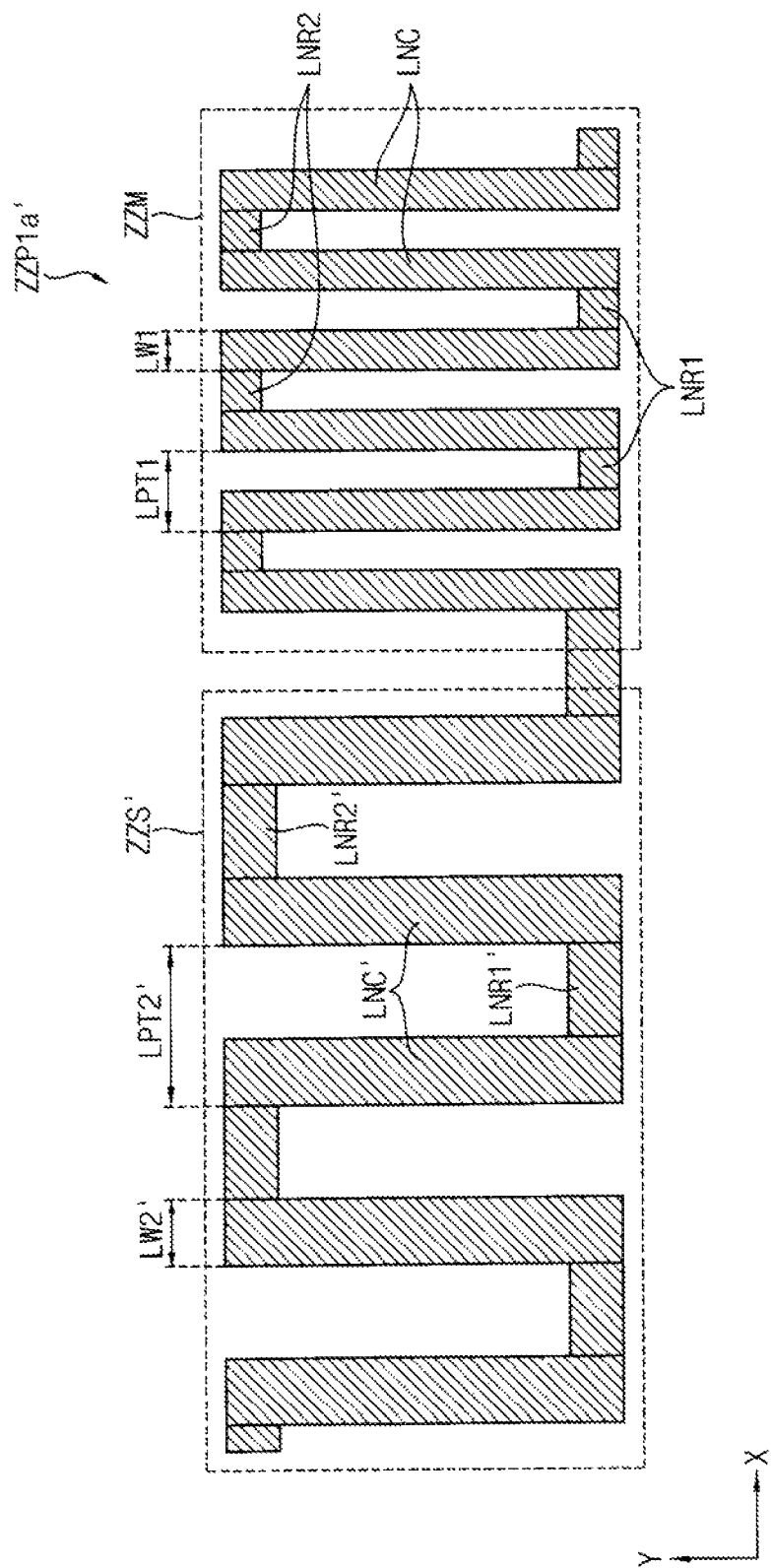
FIG. 11A is a plan view of an example of a zigzag pattern included in the heater of FIG. 9.

FIG. 11A is a plan view of an example embodiment of a zigzag pattern included in the heater of FIG. 9, and FIG. 10B is a cross-sectional view of a vertical structure of the zigzag pattern of FIG. 11A.

Figure 11B:
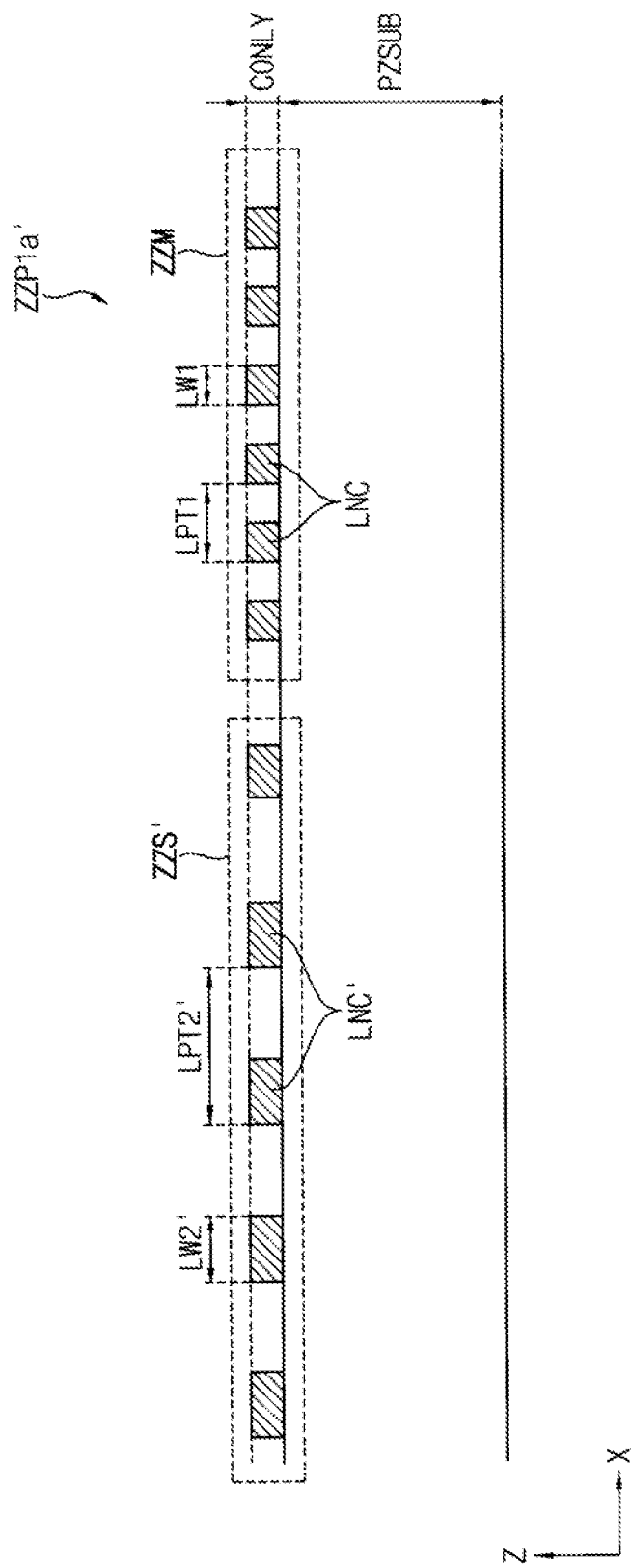
FIG. 11B is a cross-sectional view of a vertical structure of the zigzag pattern of FIG. 11A FIGS. 12 through 21 are plan views of examples of a heater included in a gas sensor according to example embodiments.

Only the first zigzag pattern ZZP1a' is illustrated in FIGS. 11A and 11B for convenience of illustration. It will be understood that, in the symmetric structure of the heater HTR2, the structures of the second through fourth zigzag patterns ZZ2a'~ZZ4a' may be implemented substantially the same as the first zigzag pattern ZZP1a'.

Hereinafter, the descriptions repeated with FIGS. 10A and 10B are omitted.

As illustrated in FIGS. 11A and 11B, a first line width LW1 of the column conduction lines LNC included in the main zigzag pattern ZZM may be smaller than a second line width LW2' of the column conduction lines LNC' included in the sub zigzag pattern ZZS'. In comparison with the sub zigzag pattern ZZS in FIGS. 10A and 10B, the amount of heat per unit area of the sub zigzag pattern ZZS' may be further decreased by increasing the line width in addition to the line pitch.

As the line width is increased, the cross-sectional area of the current path per unit area is increased and the resistance per unit area may be decreased by Expression 1. In addition, as the resistance per unit area is decreased, the amount of heat per unit area may be decreased by Expression 2. As a result, the amount of heat per unit area of the sub zigzag pattern ZZS' of FIGS. 11A and 11B may be further decreased relative to the amount of heat per unit area of the sub zigzag pattern ZZS of FIGS. 10A and 10B, because the second line width LW2' of the sub zigzag pattern ZZS' in FIGS. 11A and 11B is greater than the second line width LW2 of the sub zigzag pattern ZZS in FIGS. 10A and 10B.

As described with reference to FIGS. 10A through 11B, the amount of heat per unit area of the zigzag pattern may be adjusted by the line pitch and/or the line width of the conduction lines in the heater.

Hereinafter, the description repeated with FIGS. 7 and 11B may be omitted.

FIGS. 12 through 21 are plan views of example embodiments of a heater included in a gas sensor according to example embodiments.

Figure 12:
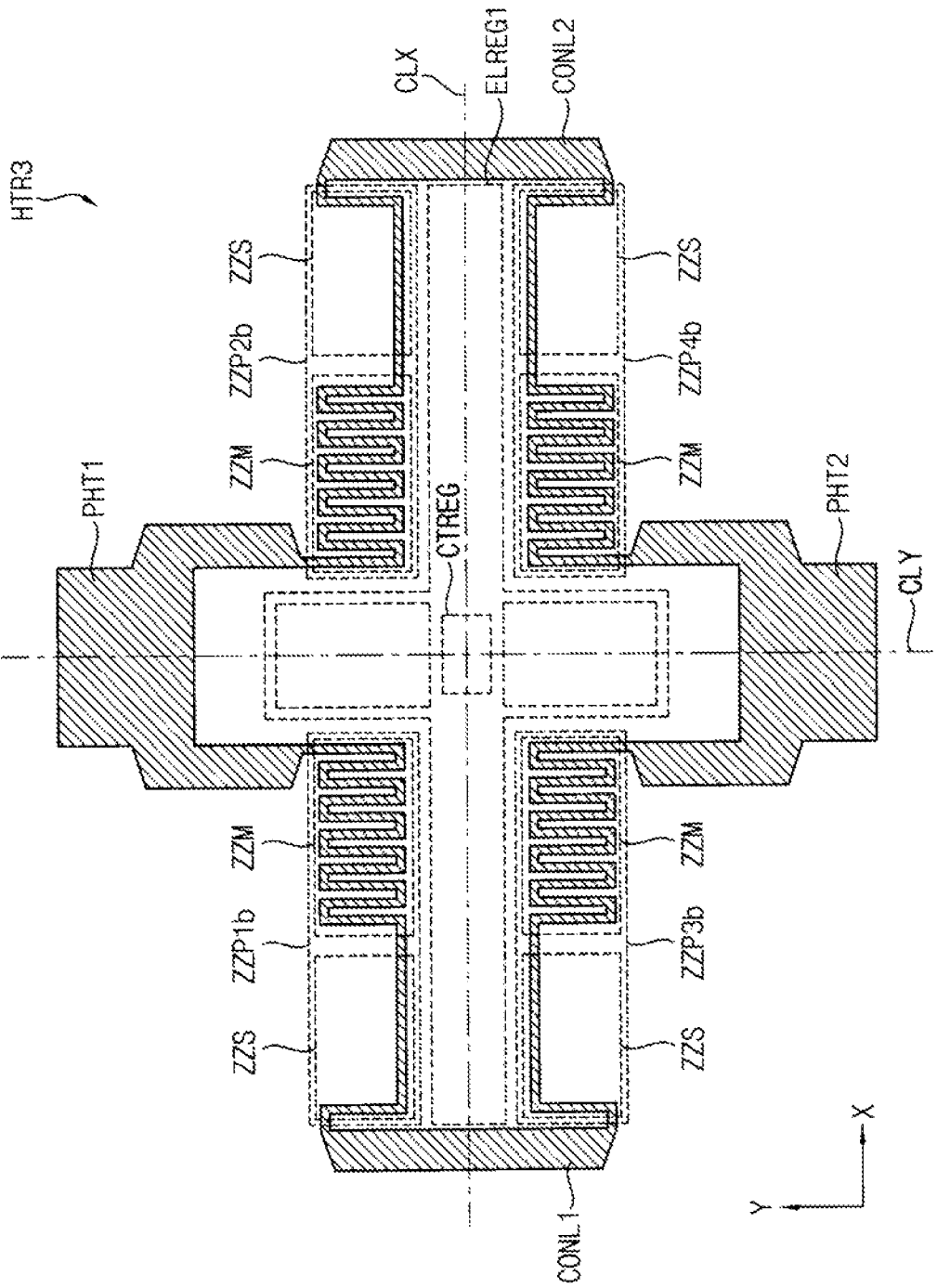

Referring to FIG. 12, a heater HTR3 may include first through fourth zigzag patterns ZZP1b~ZZP4b (corresponding to heater electrodes), a first heater pad PHT1, and a second heater pad PHT2.

The first heater pad PHT1 and the second heater pad PHT2 are respectively disposed adjacent to a side of the first pad region PDREG11 along the second center line CLY and a side of the second pad region PDREG12 along the second center line CLY.

Each of the first through fourth zigzag patterns ZZP1b~ZZP4b may include a main zigzag pattern ZZM and a sub zigzag pattern ZZS.

In comparison with the sub zigzag pattern ZZS in the heater HTR2 of FIG. 9, the sub zigzag pattern ZZS in the heater HTR3 of FIG. 12 may not include a zigzag structure and may include a single row conduction line extending in the first horizontal direction X. Accordingly the sub zigzag pattern ZZS in FIG. 12 may generate a lower amount of heat per unit area than the sub zigzag pattern ZZS in FIG. 9.

Figure 13:
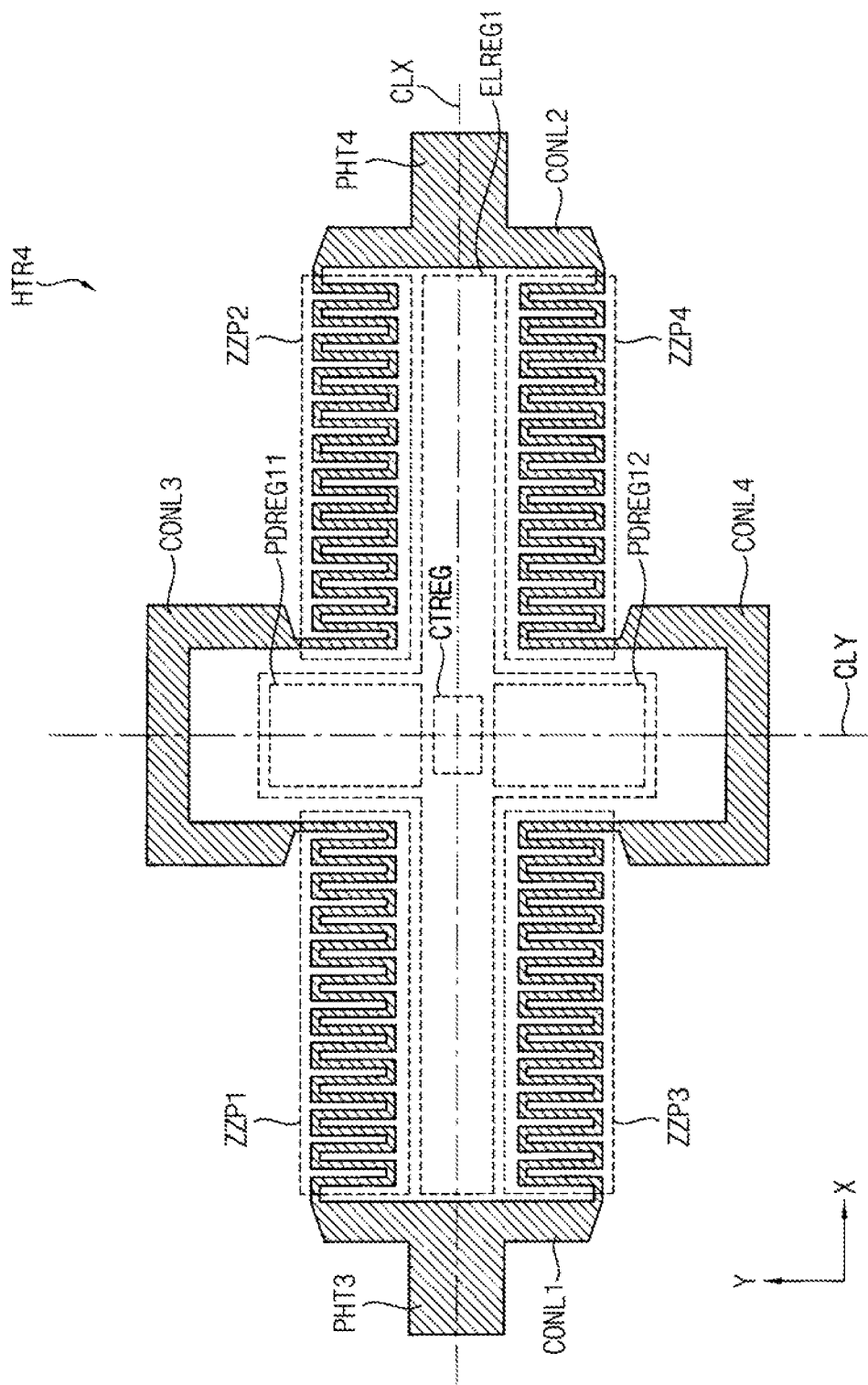
Figure 14:
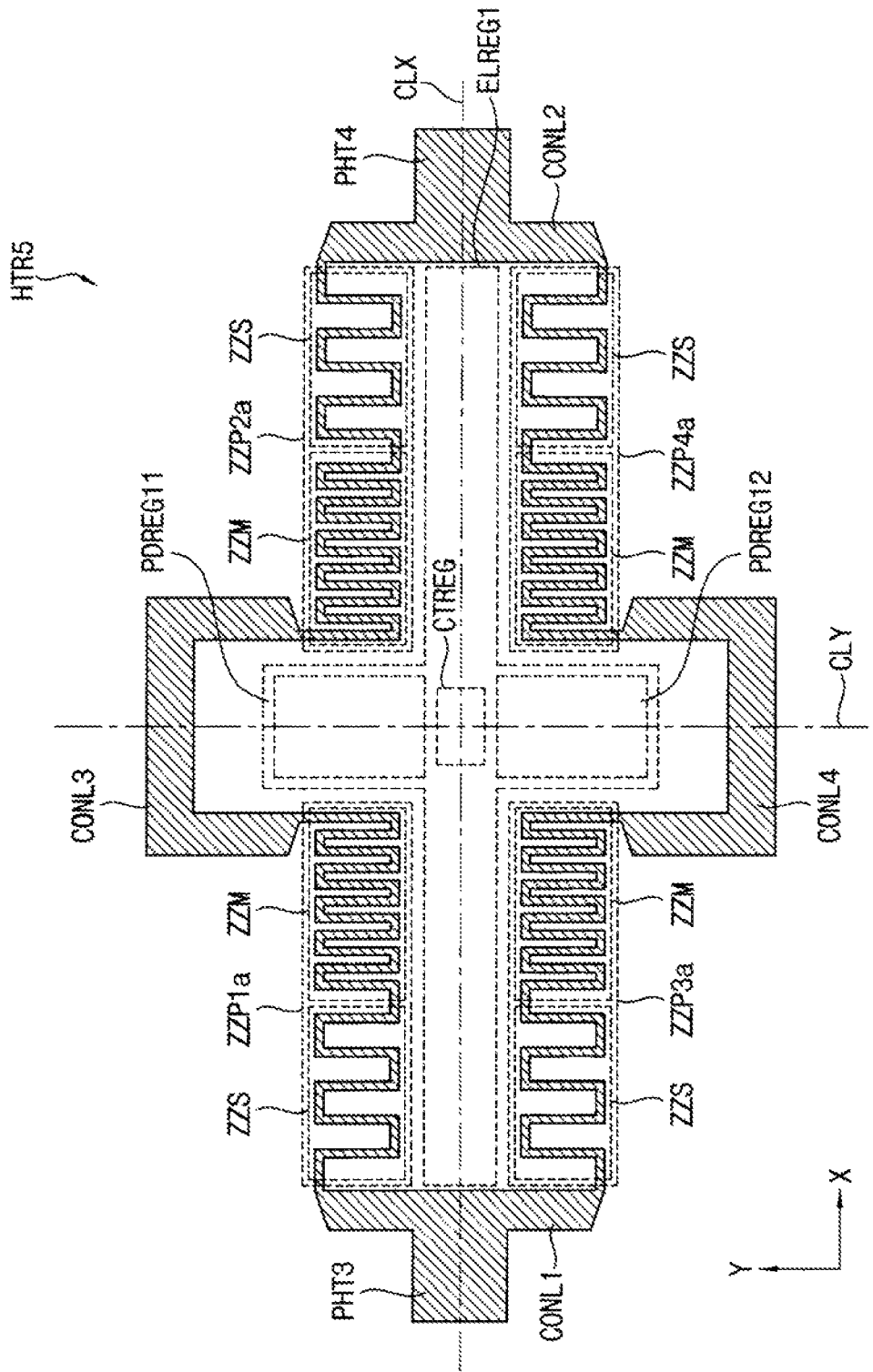
Figure 15:
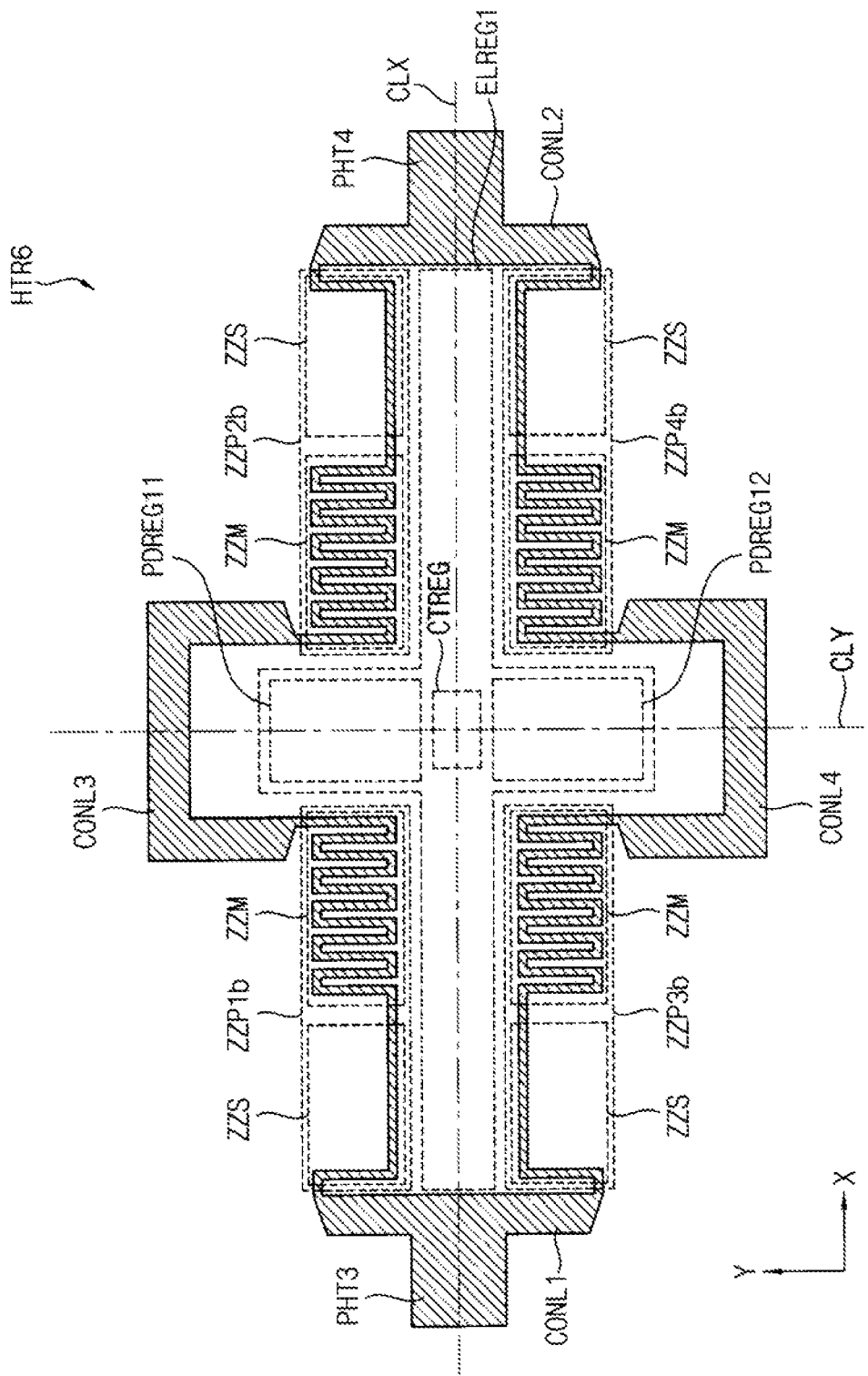

Heaters HTR4, HTR5, and HTR6 of FIGS. 13, 14, and 15 are substantially the same as the heaters HTR1, HTR2, and HTR3 of FIGS. 7, 9, and 12, respectively, except for positions of the heater pads.

Referring to FIGS. 13, 14, and 15, a first heater pad PHT3 and a second heater pad PHT4 may be disposed adjacent to both, e.g., opposite, sides of the electrode region ELREG1 along the first center line CLX. Each of first zigzag patterns ZZP1, ZZP1a, and ZZP1b may be connected to each of second zigzag patterns ZZP2, ZZP2a, and ZZP2b through a first connection conduction line CONL3. Each of third zigzag patterns ZZP3, ZZP3a, and ZZP3b may be connected to each of fourth zigzag patterns ZZP4, ZZP4a, and ZZP4b through a second connection conduction line CONL4.

Each of the heaters HTR4, HTR5, and HTR6 has the structure of the closed conduction loop and the symmetric structure to efficiently heat the sensing film SF including the sensing material without increasing the size of the gas sensor. In addition, each of the heaters HTR4, HTR5, and HTR6 has the zigzag patterns to efficiently increase the amount of heat per unit area, and the line pitch and/or the line width of the zigzag patterns may be adjusted to reduce the power consumption of the gas sensor.

FIGS. 16 through 21 illustrate example embodiments of a heater corresponding to the electrode region ELREG2 having a rod shape as illustrated in FIG. 5. The IDT pads PEL1~PEL4 may be disposed in a first pad region PDREG21 and a second pad region PDREG22, the first pad region PDREG21 and the second pad region PDREG22 corresponding to both, e.g., opposite end portions of the electrode region ELREG2 along the first center line CLX.

Figure 16:
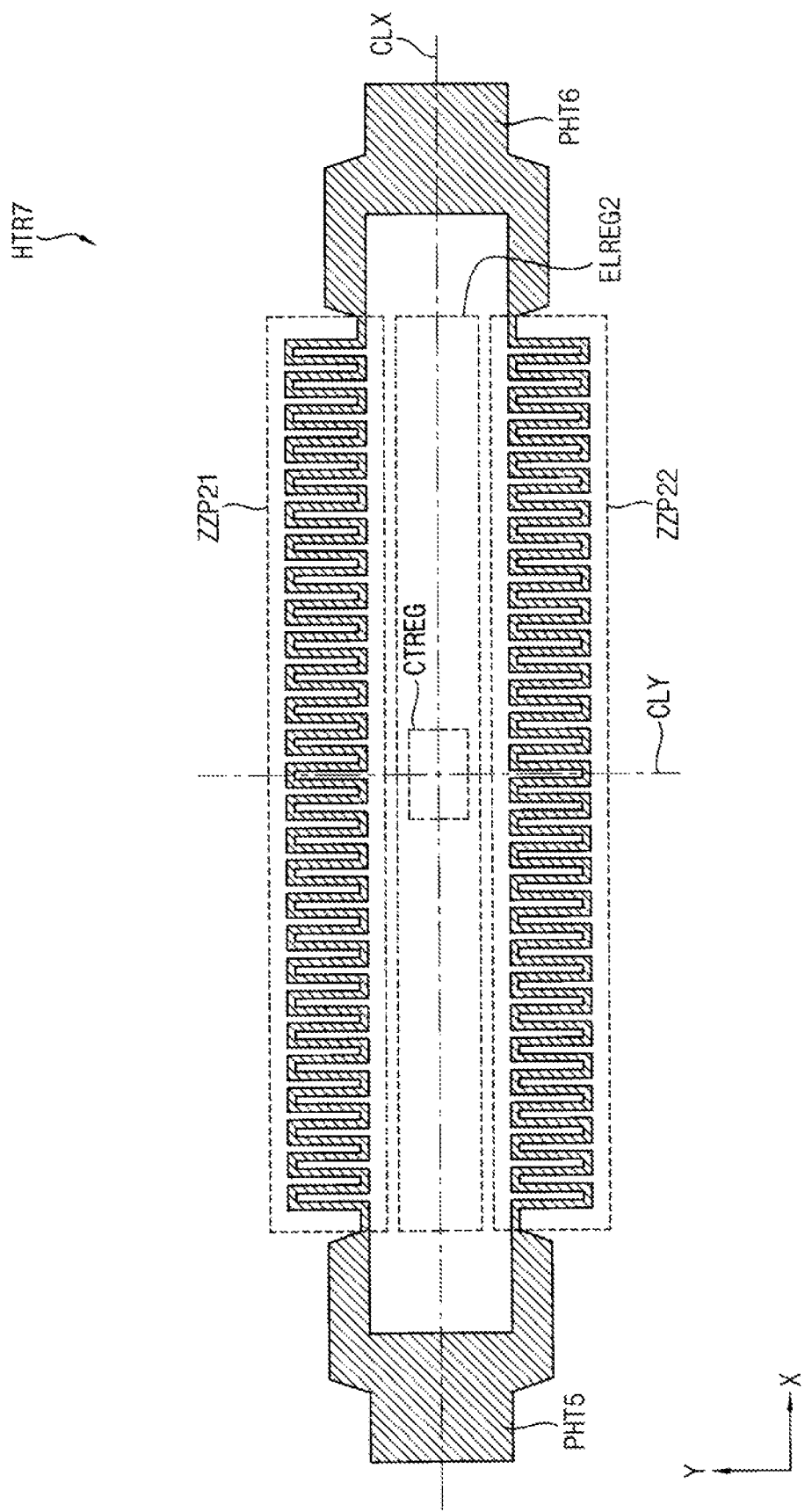

Referring to FIG. 16, a heater HTR7 may include first and second zigzag patterns ZZP21 and ZZP22 (corresponding to heater electrodes), a first heater pad PHT5, and a second heater pad PHT6.

The first heater pad PHT5 and the second heater pad PHT6 are respectively disposed adjacent to both, e.g., opposite, sides of the electrode region ELREG2 along the first center line CLX. The first zigzag pattern ZZP21 and the second zigzag pattern ZZP22 may be respectively disposed adjacent to both, e.g., opposite, sides of the electrode region ELREG2 in the second horizontal direction Y.

As such, the first zigzag pattern ZZP21, the second zigzag pattern ZZP22, the first heater pad PHT5, and the second heater pad PHT6 included in the heater HTR7 may form a closed conduction loop, and may be symmetric with respect to each of the first center line CLX and the second center line CLY.

As described with reference to FIGS. 8A and 8B, a line pitch in the first horizontal direction X of two adjacent column conduction lines may be uniform with respect to all of the column conduction lines included in the first zigzag pattern ZZP21 and the second zigzag pattern ZZP22. As a result, the first zigzag pattern ZZP21 and the second zigzag pattern ZZP22 may generate a uniform amount of heat per unit area.

Figure 17:
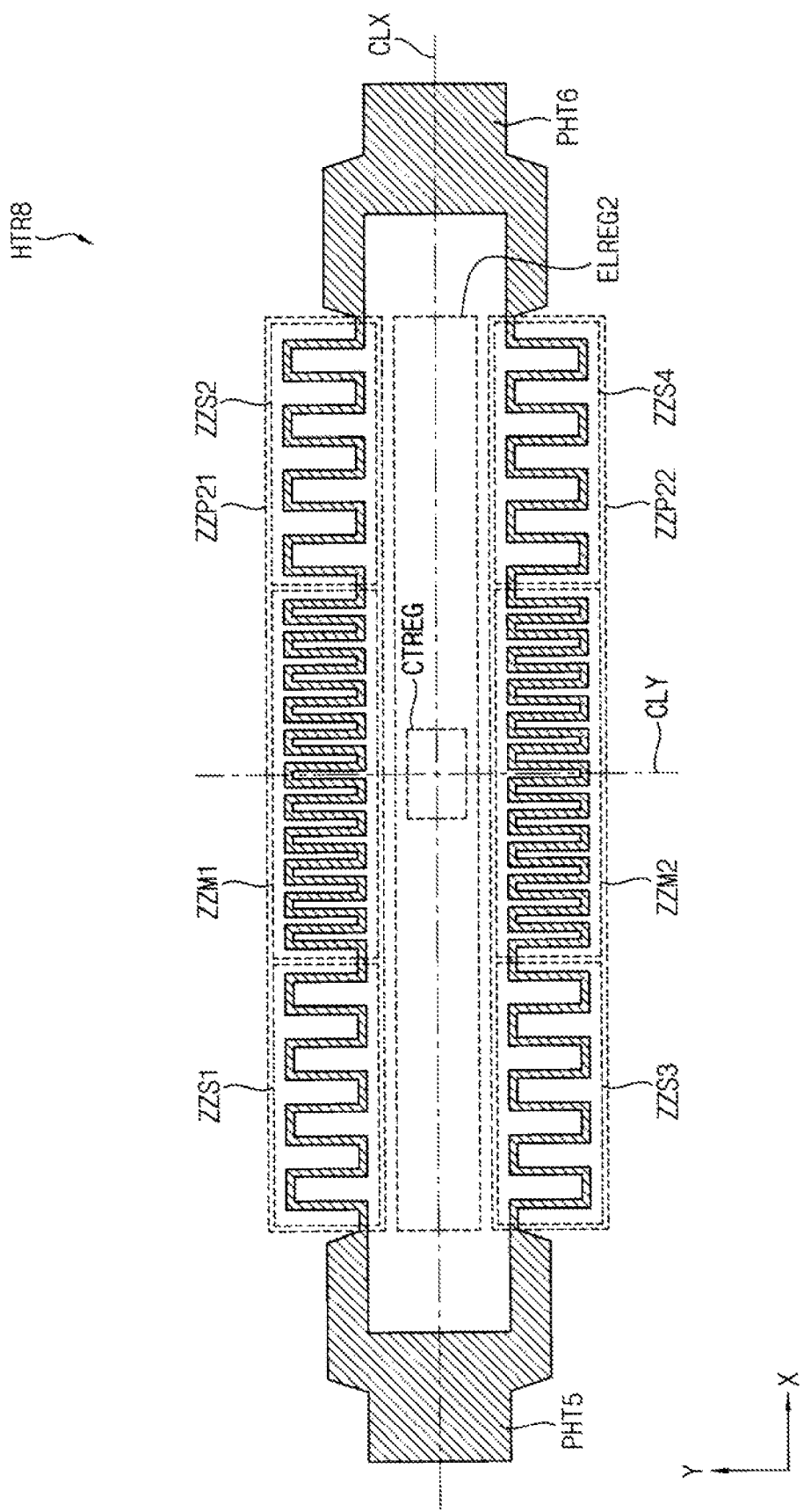

Referring to FIG. 17, a heater HTR8 may include first and second zigzag patterns ZZP21 and ZZP22 (corresponding to heater electrodes), a first heater pad PHT5, and a second heater pad PHT6.

The first heater pad PHT5 and the second heater pad PHT6 are respectively disposed adjacent to both, e.g., opposite, sides of the electrode region ELREG2 along the first center line CLX. The first zigzag pattern ZZP21 and the second zigzag pattern ZZP22 may be respectively disposed adjacent to both, e.g., opposite, sides of the electrode region ELREG2 in the second horizontal direction Y.

As such, the first zigzag pattern ZZP21, the second zigzag pattern ZZP22, the first heater pad PHT5, and the second heater pad PHT6 included in the heater HTR8 may form a closed conduction loop, and may be symmetric with respect to each of the first center line CLX and the second center line CLY.

The first zigzag pattern ZZP21 may include a first main zigzag pattern ZZM1, a first sub zigzag pattern ZZS1, and a second sub zigzag pattern ZZS2. The first main zigzag pattern ZZM1 may be disposed adjacent to a first side of the center region CTREG in the second horizontal direction Y, and the first main zigzag pattern ZZM1 may generate a first amount of heat per unit area. The first and second sub zigzag patterns ZZS1 and ZZS2 may be respectively disposed adjacent to both, e.g., opposite, sides of the first main zigzag pattern ZZM1 in the first horizontal direction X. The first and second sub zigzag patterns ZZS1 and ZZS2 may generate a second amount of heat per unit area, the second amount of heat per unit area being less than the first amount of heat per unit area.

The second zigzag pattern ZZP22 may include a second main zigzag pattern ZZM2, a third sub zigzag pattern ZZS3, and a fourth sub zigzag pattern ZZS4. The second main zigzag pattern ZZM2 may be disposed adjacent to a second side of the center region CTREG in the second horizontal direction Y, and the second main zigzag pattern ZZM2 may generate the first amount of heat per unit area. The third and fourth sub zigzag patterns ZZS3 and ZZS4 may be respectively disposed adjacent to both, e.g., opposite, sides of the second main zigzag pattern ZZM2 in the first horizontal direction X, and the third and fourth sub zigzag patterns ZZS3 and ZZS4 may generate the second amount of heat per unit area.

As described with reference to FIGS. 10A through 11B, the first amount of heat per unit area of the first and second main zigzag patterns ZZM1 and ZZM2 may be greater than the second amount of heat per unit area of the first through sub zigzag patterns ZZS1~ZZS4 by adjusting the line pitch and/or the line width of the conduction lines.

As such, the heat generated by the heater HTR8 may be concentrated on the sensing film SF disposed in the center region CTREG to reduce power consumption by disposing the first and second main zigzag patterns ZZM1 and ZZM2 (generating the larger amount of heat per unit area) nearer to the center region CTREG than the first through fourth sub zigzag patterns ZZS1~ZZS4 (generating the less amount of heat per unit area).

Figure 18:
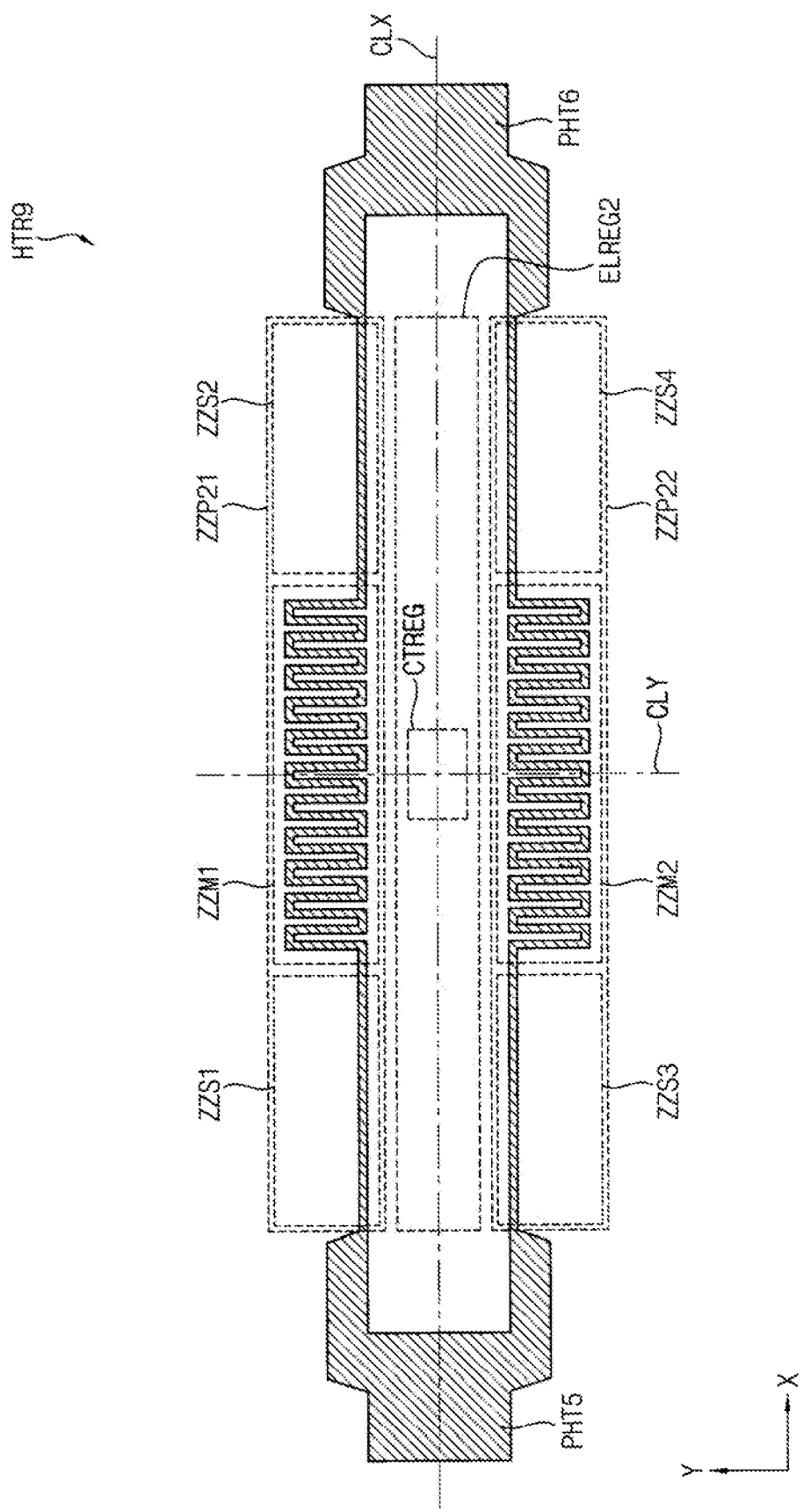

In comparison with the first though fourth sub zigzag patterns ZZS1~ZZS4 in the heater HTR8 of FIG. 17, each of the first through fourth sub zigzag patterns ZZS1~ZZS4 in a heater HTR9 of FIG. 18 may not include a zigzag structure and may include a single row conduction line extending in the first horizontal direction X. Accordingly the first through fourth sub zigzag patterns ZZS1~ZZS4 in FIG. 18 may generate the lower amount of heat per unit area than the first through fourth sub zigzag patterns ZZS1~ZZS4 in FIG. 17.

Figure 19:
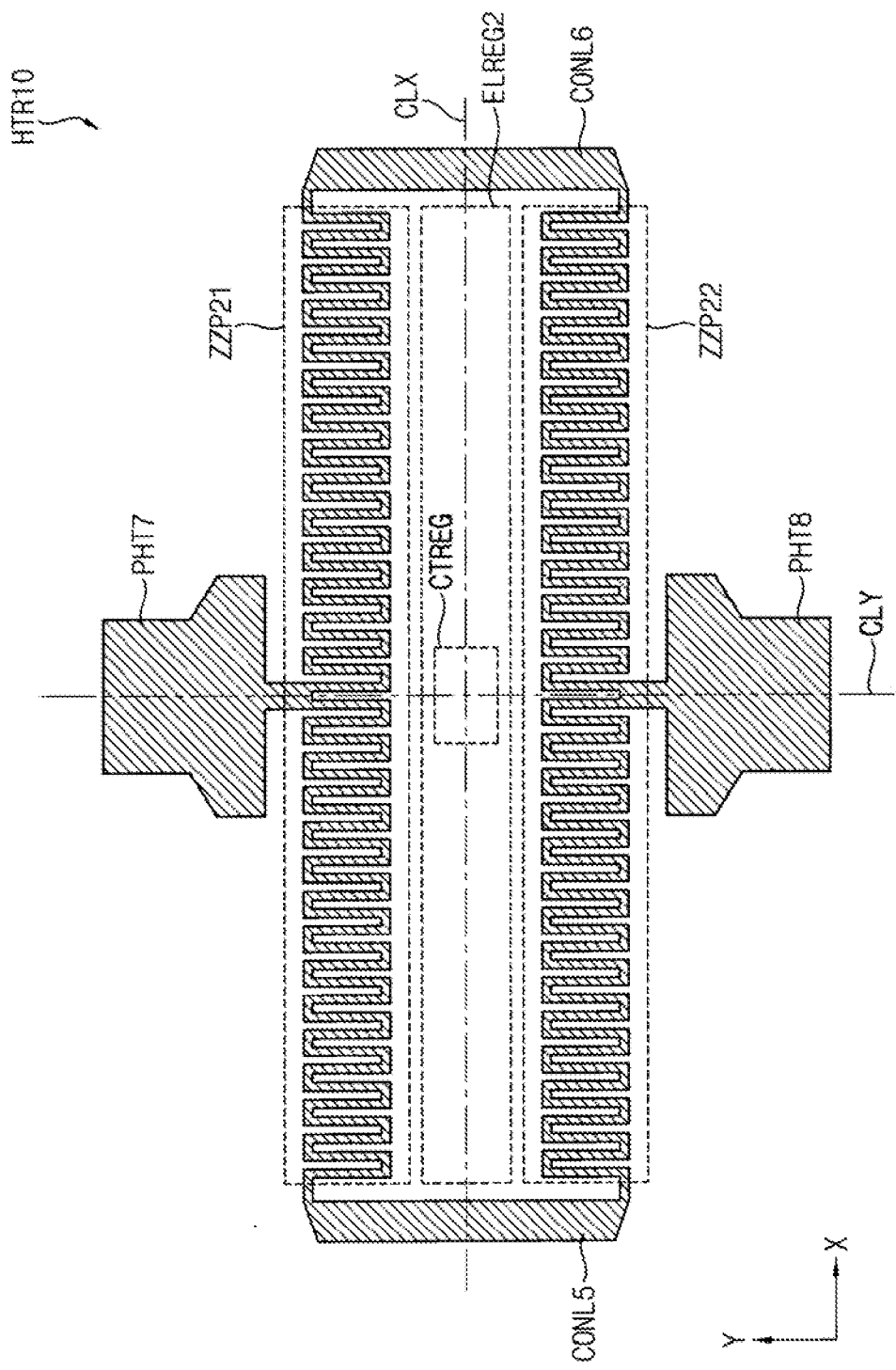
Figure 20:
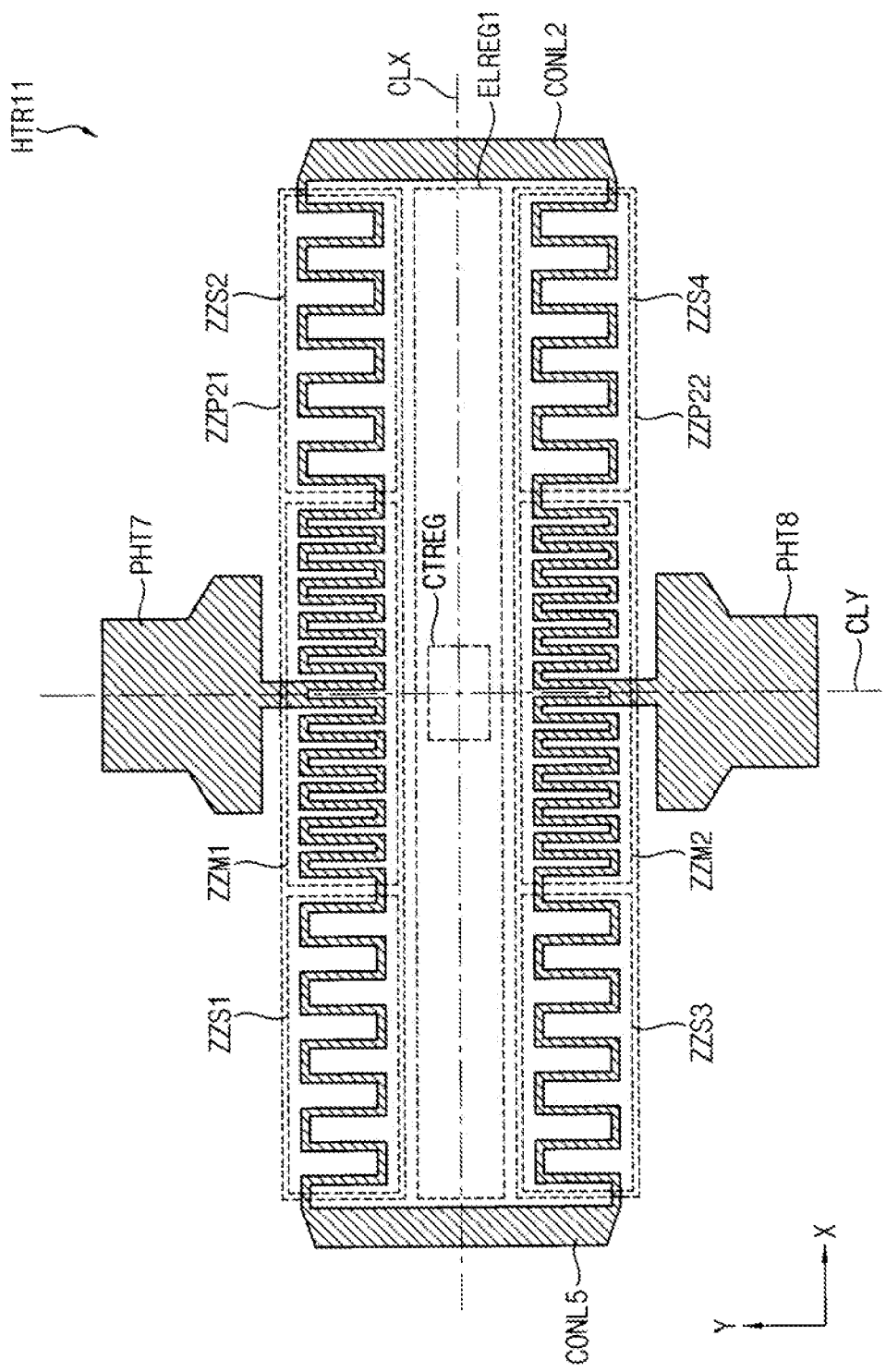
Figure 21:
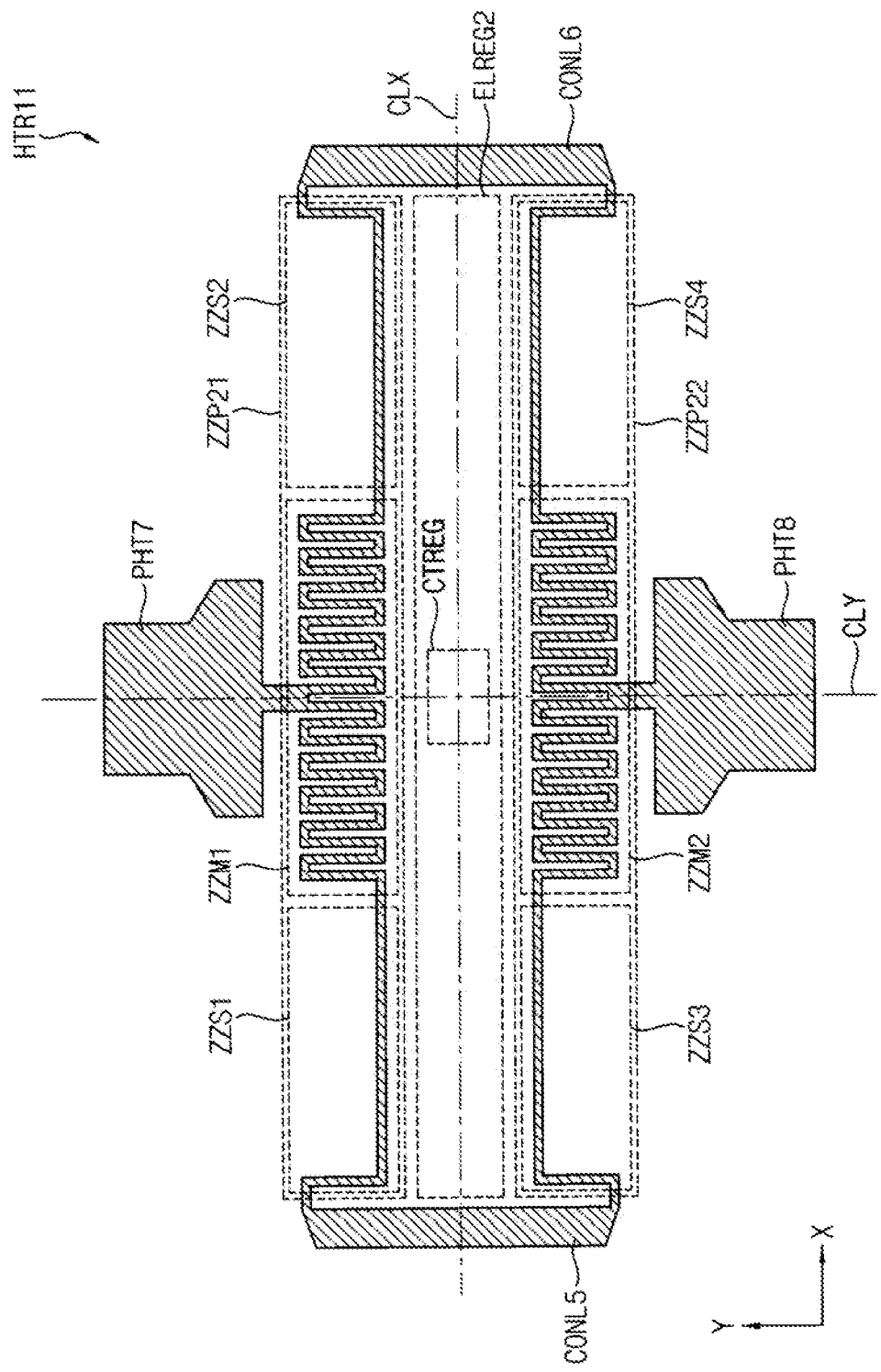

Heaters HTR10, HTR11, and HTR12 of FIGS. 19, 20, and 21 are substantially the same as the heaters HTR7, HTR8 and HTR9 of FIGS. 16, 17, and 18, respectively, except positions of the heater pads.

Referring to FIGS. 19, 20, and 21, a first heater pad PHT7 and a second heater pad PHT8 may be respectively disposed adjacent to a side of the first zigzag pattern ZZP21 and a side of the second zigzag pattern ZZP22 along the second center line CLY. The first zigzag pattern ZZP21 may be connected to the second zigzag pattern ZZP22 through two connection conduction lines CONL5 and CONL6.

Each of the heaters HTR10, HTR11, and HTR12 has the structure of the closed conduction loop and the symmetric structure to efficiently heat the sensing film SF including the sensing material without increasing the size of the gas sensor. In addition, each of the heaters HTR10, HTR11, and HTR12 has the zigzag patterns to efficiently increase the amount of heat per unit area, and the line pitch and/or the line width of the zigzag patterns may be adjusted to reduce the power consumption of the gas sensor.

Figure 22A:
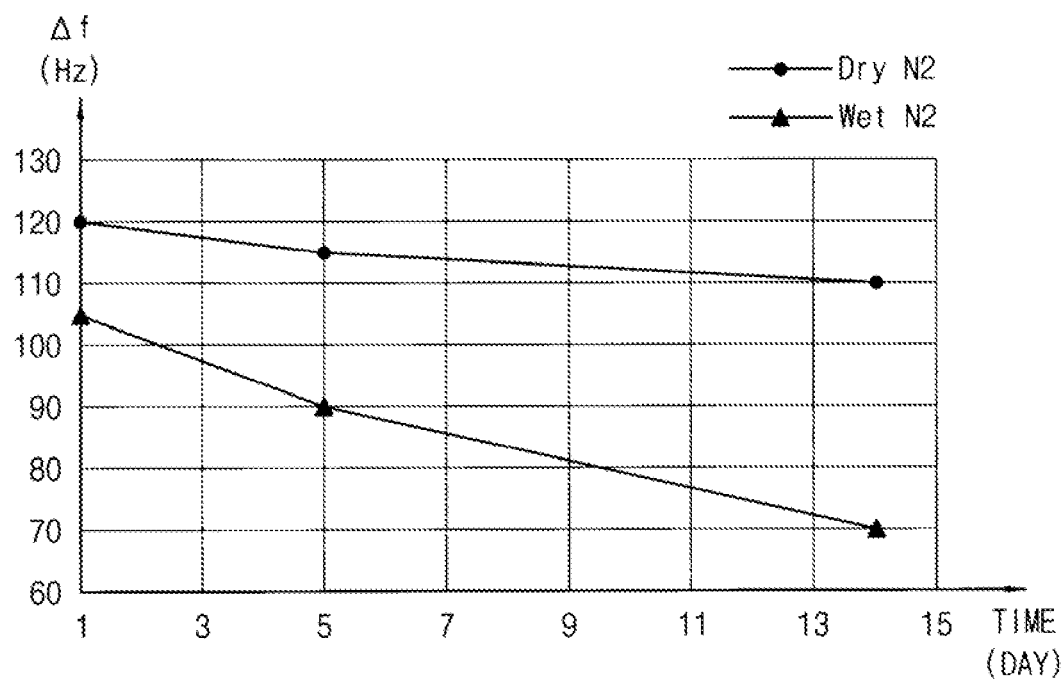
FIGS. 22A, 22B and 22C are diagrams illustrating degeneration and regeneration of a gas sensor according to an example embodiment.
Figure 22B:
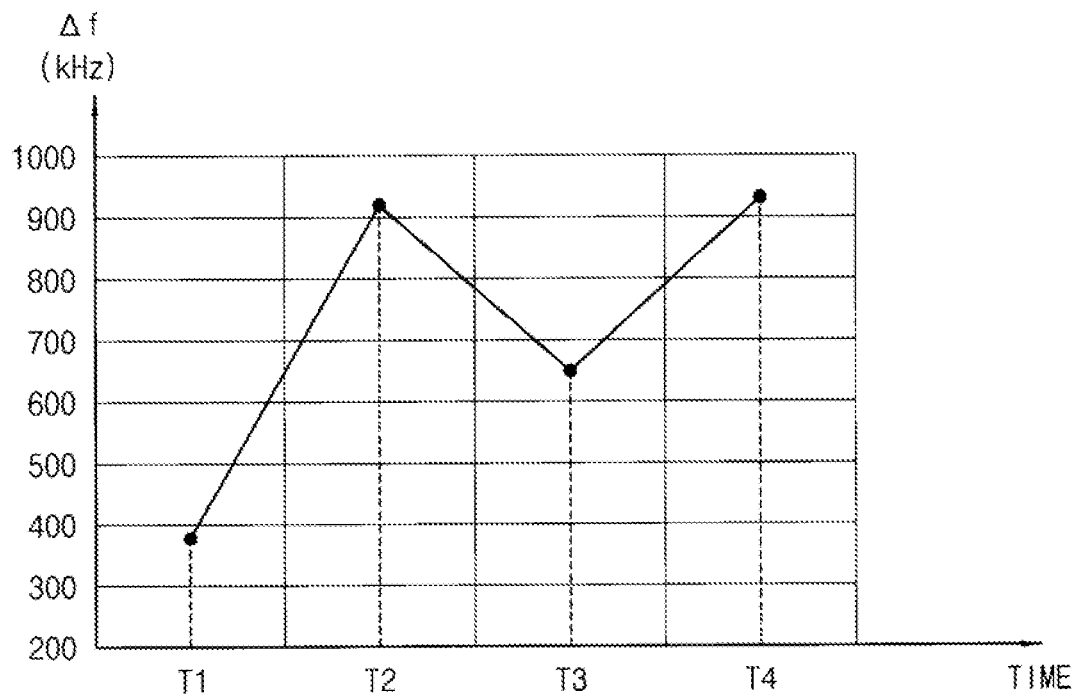
Figure 22C:
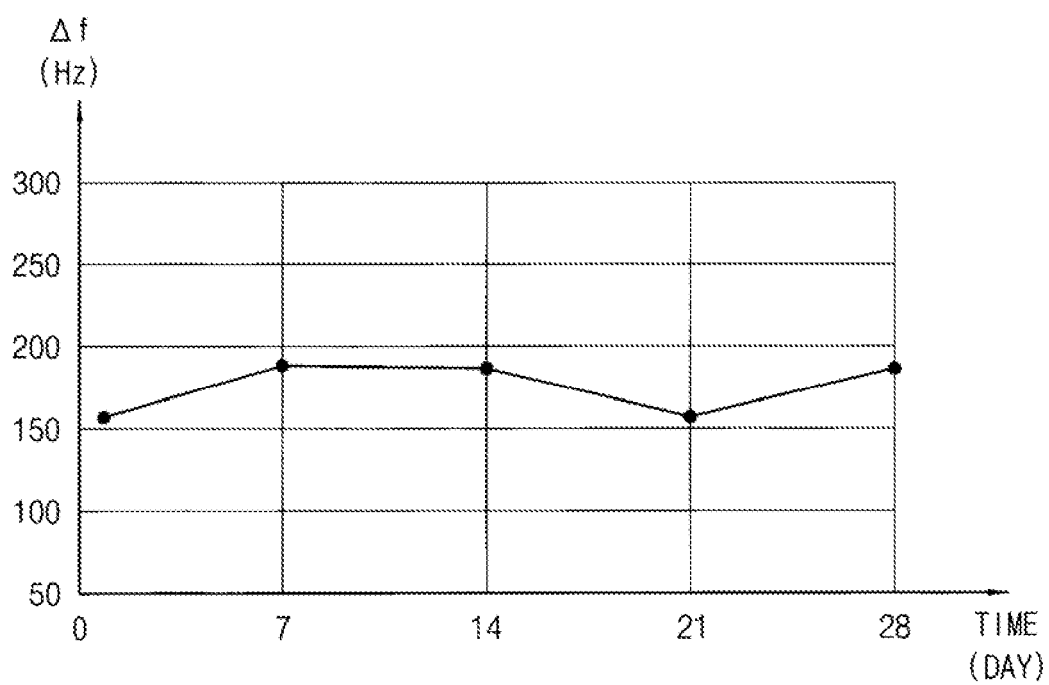

FIGS. 22A, 22B and 22C are diagrams illustrating degeneration and regeneration of a gas sensor according to an example embodiment.

In general, a sensing material may be exposed externally, e.g., to the outside, so that a gas sensor may operate based on a chemical reaction or interaction of the sensing material and a target gas. In case of a resonance-based gas sensor, degeneration of the sensor may be caused due to influences of environments such as moisture in the atmosphere. For example, in case of the gas sensor using the SAW, the resonance frequency may be varied due to the influences of environments.

Among ways to estimate reliability of a gas sensor, repeatability is an estimation of whether the gas sensor provides the same results in the same condition. If the gas sensor is affected by the environments such as temperature, humidity, etc., and degeneration results, then repeatability may be degraded.

FIG. 22A illustrates the reactive degeneration of the gas sensor due to the exposed environments. Two samples were aged and disposed respectively in a dry nitrogen ($N_2$) atmosphere and in a wet $N_2$ atmosphere for 1, 5, and 14 days, and the frequency shifts Δf were measured after the sensing film reacted with toluene gas as an example of the target gas. The reaction amount (frequency shift) is decreased from 120 Hz to 110 Hz in the dry $N_2$ case, but from 105 Hz to 70 Hz in the wet $N_2$ case, which is about three times that of the dry $N_2$ case. Without being bound by theory, it is believed that the larger decrease in the wet $N_2$ case was due to hydration of the sensing material.

To prevent hydration of the sensing material, the surface of the sensing film including the sensing material may be coated with a hydrophobic layer. However, it may be difficult to block the moisture selectively, and also the sensing sensitivity of the target gas may be degraded. According to example embodiments, the sensing film may be heated, e.g., periodically or non-periodically, to remove the moisture combined with the sensing material to regenerate the reaction amount, e.g., frequency shift, to maintain sensitivity. Because hydration is a reversible chemical reaction, the degeneration may be reduced or prevented by heating the sensing film.

FIG. 22B illustrates the results of heating to remove the hydration of the sensing material. The sample was heated for about two minutes on a hot plate of 200° C. In FIG. 22B, T1 is a time point just after the sample is manufactured, T2 is a first regeneration (i.e., heating), T3 is a time point after aging of seven days, and T4 is a time point after second regeneration. As shown in FIG. 22B, the reaction amount, e.g., frequency shift, may be recovered after the regeneration.

FIG. 22C shows improvement of repeatability of a gas sensor by periodic regeneration. The gas sensor was heated once by the period of seven days and the reaction amounts were measured after heating. As shown in FIG. 22C, the reaction amount, e.g., frequency shift, may be maintained for at least about a month by the periodic heating.

In general, when a heater is formed on a package that contains a gas sensor, the entire package is heated to heat the sensing material to a desired temperature. Thus, the power consumption may be increased and the other components in the package may be degraded.

According to example embodiments, a Micro-Electro-Mechanical Systems (MEMS) heater may be implemented on the surface of the piezoelectric substrate PZSUB, and the power consumption may be reduced significantly by intensively heating the sensing material using the MEMS heater having the structure of the closed conduction loop and the symmetric structure.

Figure 23:
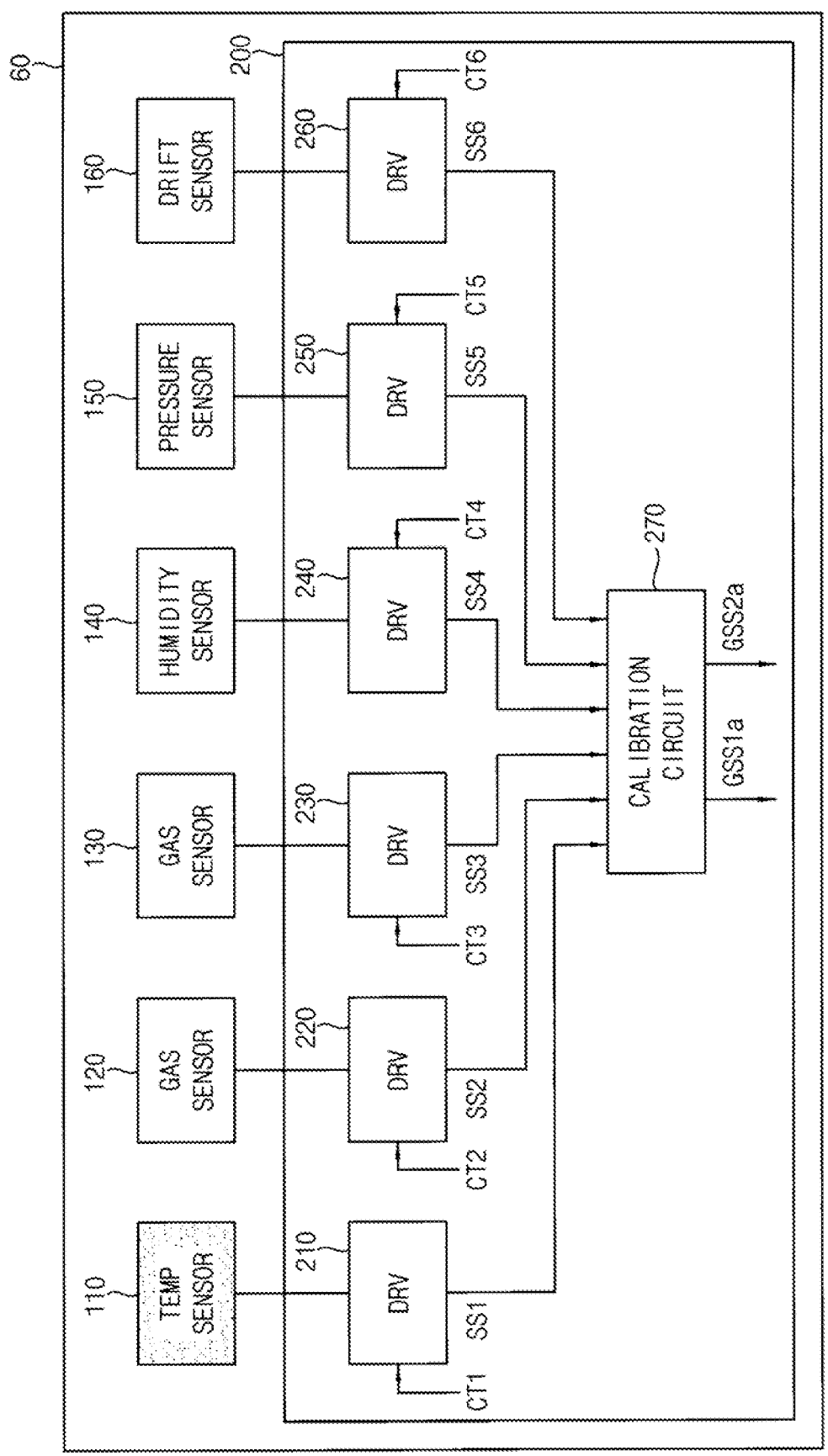
FIG. 23 is a block diagram illustrating a gas sensing device according to an example embodiment.

FIG. 23 is a block diagram illustrating a gas sensing device according to an example embodiment.

Referring to FIG. 23, a gas sensing device 60 may include a temperature sensor 110, a first gas sensor 120, a second gas sensor 130, a humidity sensor 140, a pressure sensor 150, and a drift sensor (or a drift compensation sensor) 160. The temperature sensor 110, the humidity sensor 140, the pressure sensor 150, and the drift compensation sensor 160 may be environmental sensors. In an example embodiment, the gas sensing device 60 may further include a plurality of gas sensors or a plurality of environmental sensors.

In the gas sensing device 60, each of the temperature sensor 110, the first gas sensor 120, the second gas sensor 130, the humidity sensor 140, the pressure sensor 150, and the drift compensation sensor 160 may be implemented as an SAW device and mounted on a driving circuit chip 200. The first gas sensor 120 may sense a first gas, and the second gas sensor 130 may sense a second gas. In an example embodiment, the first and second gas sensors 120 and 130 may be formed on respectively different wafers and thus, implemented as individual semiconductor dies or semiconductor chips. In an example embodiment, the first and second gas sensors 120 and 130 may be formed on the same wafer and thus, implemented as a single semiconductor die or a single semiconductor chip.

The humidity sensor 140 may sense ambient humidity and output a humidity sensing result. The pressure sensor 150 may sense an atmospheric pressure and output an atmospheric pressure sensing result. For example, the pressure sensor 150 may have an encapsulation-type cavity between a substrate and a SAW device and sense an atmospheric pressure. The drift compensation sensor 160 may sense the aging of the SAW device and output a drift sensing result. For example, the drift compensation sensor 160 may include a SAW device with which a sensing film is not coated. The influence of the aging of the SAW device may be removed from a gas sensing result using the drift sensing result.

The driving circuit chip 200 may include first through sixth drivers DRV 210~260, which may respectively correspond to the temperature sensor 110, the first gas sensor 120, the second gas sensor 130, the humidity sensor 140, the pressure sensor 150, and the drift compensation sensor 160. Each of the sensors 110~160 may include a resonator and a heater as described above, and each of the first through sixth drivers 210~260 may drive the resonator and the heater based on each of first through sixth control signals CT1~CTCT6.

The first through sixth drivers 210~260 may generate first through sixth sensing signals SS1~SS6 in response to a variation in resonance frequencies of the sensors 110~116, respectively.

The driving circuit chip 200 may further include a calibration circuit 270. The calibration circuit 270 may calibrate the second sensing signal SS2 based on the first, fourth, fifth, and sixth sensing signals SS1, SS4, SS5, and SS6, and generate a first gas sensing signal GSS1a. In addition, the calibration circuit 270 may calibrate the third sensing signal SS3 based on the first, fourth, fifth, and sixth sensing signals SS1, SS4, SS5, and SS6, and generate a second gas sensing signal GSS2a. As such, the influence of temperature, humidity, atmospheric pressure, and drift may be removed from sensing results output by the first and second gas sensors 120 and 130, thereby further improving precisions of sensing results of the first and second gases.

Although FIG. 23 illustrates a case in which the calibration circuit 270 is included in the driving circuit chip 200, the calibration circuit 270 may be included in, e.g., an application processor (AP) or a system on chip (SOC). In an example embodiment, the first through sixth sensing signals SS1 to SS6 may be provided to the AP or the SOC, and the AP or the SOC may calibrate the second sensing signal SS2 and/or the third sensing signal SS3 based on the first, fourth, fifth, and sixth sensing signals SS1, SS4, SS5, and SS6, and generate the first gas sensing signal GSS1a and/or the second gas sensing signal GSS2a.

To improve the accuracy of calibration, the environment sensors 110, 140, 150, and 160 and the first and second gas sensors 120 and 130 may be implemented to generate the sensing signals SS1~SS6 under the same operational conditions. According to an example embodiment, the first and second gas sensors 120 and 130, the temperature sensor 110, and the humidity sensor 140 may include respective heaters having the same structure. The driving circuit chip 200 may drive the heaters of the first and second gas sensors 120 and 130, the temperature sensor 110, and the humidity sensor 140 simultaneously to implement an identical temperature condition with respect to the first and second gas sensors 120 and 130, the temperature sensor 110, and the humidity sensor 140, thereby implementing accurate calibration by the calibration circuit 270.

Figure 24:
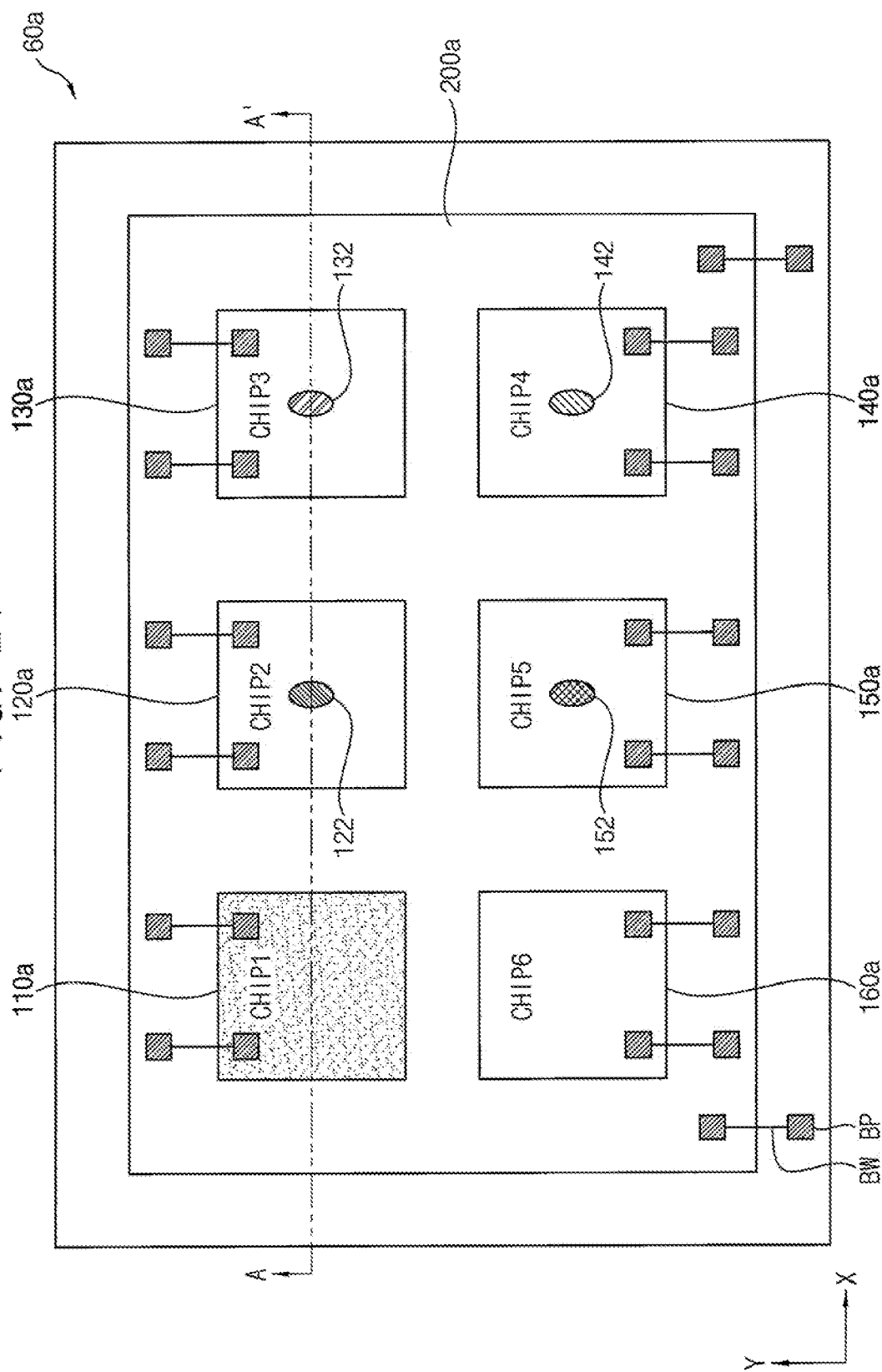
FIG. 24 is a plan view of a sensor array module according to an example embodiment.
Figure 25:
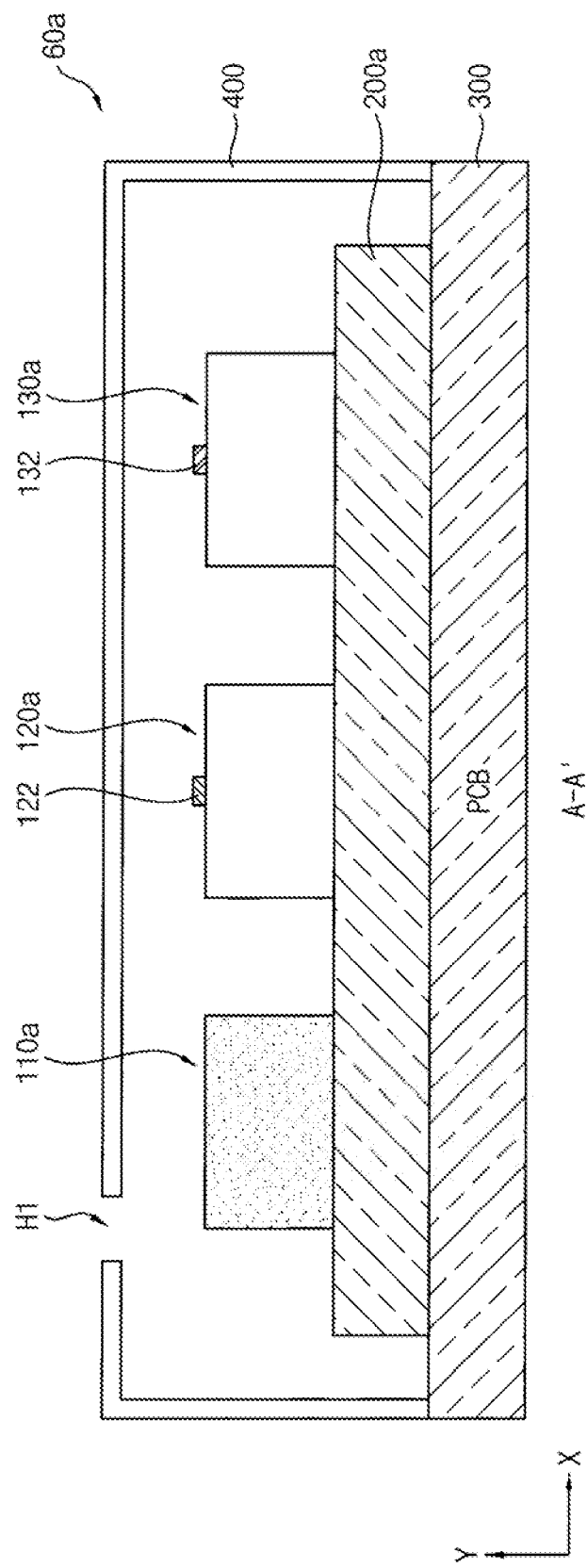
FIG. 25 is a cross-sectional view of the sensor array module of FIG. 24.

FIG. 24 is a plan view of a sensor array module according to an example embodiment, and FIG. 25 is a cross-sectional view of the sensor array module of FIG. 24, which is cut along a line A-A'.

Referring to FIGS. 24 and 25, a sensor array module or a gas sensing device 60a may include a substrate 300 and a driving circuit chip 200a mounted on the substrate 300. A first sensor chip CHIP1 110a, a second sensor chip CHIP2 120a, a third sensor chip CHIP3 130a, a fourth sensor chip CHIP4 140a, a fifth sensor chip CHIP5 150a, and a sixth sensor chip CHIP6 160a may be mounted on the driving circuit chip 200a.

The gas sensing device 60a may further include a case member 400, which may be located over the substrate 300, the driving circuit chip 200a, and the sensor chips 110a-160a. At least one hole H1 may be formed in the case member 400. Gases may be supplied into or discharged from the gas sensing device 60a through the hole H1 so that first and second sensing films 122 and 132 located respectively on the second and third sensor chips 120a and 130a may sense target gases. The case member 400 may be referred to as a cover member or a housing. In an example embodiment, the case member 400 may be implemented as stainless steel or a plastic. In an example embodiment, a top surface of the case member 400 may be implemented as a mesh shape so that the gases may be introduced or discharged more actively.

The first sensor chip 110a, the second sensor chip 120a, the third sensor chip 130a, the fourth sensor chip 140a, the fifth sensor chip 150a, and the sixth sensor chip 160a may respectively correspond to embodied examples of the temperature sensor 110, the first gas sensor 120, the second gas sensor 130, the humidity sensor 140, the pressure sensor 150, and the drift compensation sensor 160 of FIG. 23.

The temperature sensor chip 110a, the first gas sensor chip 120a, the second gas sensor chip 130a, the humidity sensor chip 140a, the pressure sensor chip 150a, and the drift compensation sensor chip 160a may be formed on respectively different wafers and thus, implemented as individual semiconductor dies or individual semiconductor chips. In this case, each of the temperature sensor chip 110a, the first gas sensor chip 120a, the second gas sensor chip 130a, the humidity sensor chip 140a, the pressure sensor chip 150a, and the drift compensation sensor chip 160a may include a SAW device (or a SAW resonator) and a heater as described above.

The temperature sensor chip 110a may have an encapsulation structure that does not expose the SAW resonator to the outside. The first gas sensor chip 120a may include a first sensing film 122 that is coated on an upper surface of a piezoelectric substrate, and the first sensing film 122 may be exposed to the outside and sense a first gas. The second gas sensor chip 130a may include a second sensing film 132 that is coated on an upper surface of a piezoelectric substrate, and the second sensing film 132 may be exposed to the outside and sense a second gas. The humidity sensor chip 140a may include a third sensing film 142 that is coated on an upper surface of a piezoelectric substrate, and the third sensing film 142 may be exposed to the outside and sense humidity. The pressure sensor chip 150a may include a fourth sensing film 152 that is coated on an upper surface of a piezoelectric substrate, and an encapsulation-type cavity and sense an atmospheric pressure. The drift compensation sensor chip 160a may be implemented not to include a sensing film to compensate a frequency variation caused by the aging of the sensors.

The sensor chips 110a-160a may be electrically connected to an external device through pads BP formed on the sensor chips and/or the driving circuit chip 200a and bonding wires BW.

Figure 26:
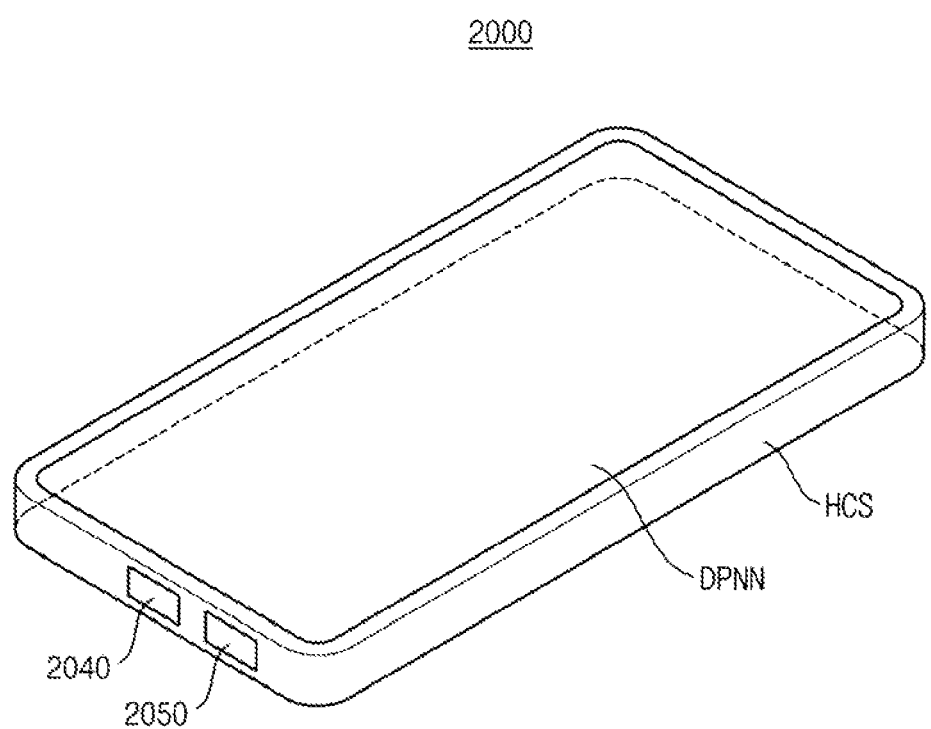
FIG. 26 is a perspective view of a mobile device according to an example embodiment.
Figure 27:
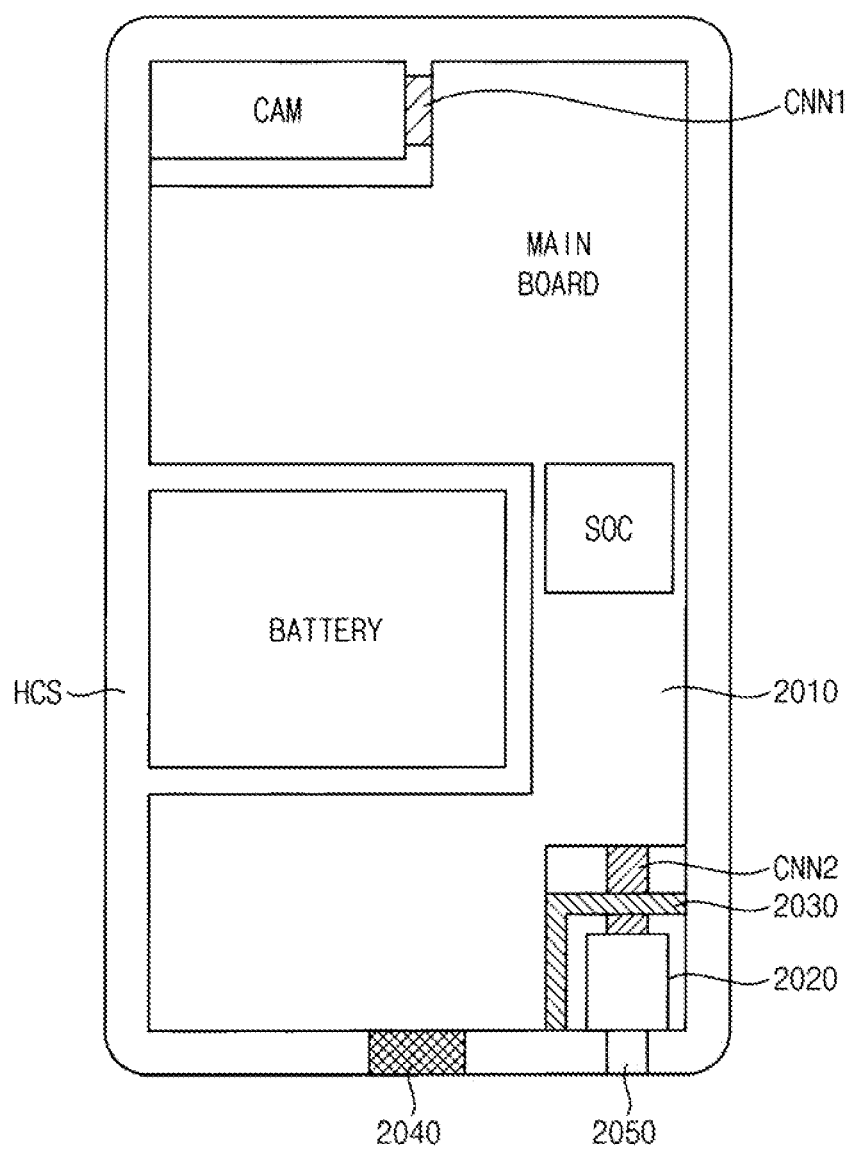
FIG. 27 is a diagram illustrating an example of a layout of the mobile device of FIG. 26.

FIG. 26 is a perspective view of a mobile device according to an example embodiment, and FIG. 27 is a diagram illustrating an example embodiment of a layout of the mobile device of FIG. 26.

Referring to FIGS. 26 and 27, a mobile device 2000 such as, e.g., a smartphone, may include a housing case HCS, a main board 2010, a sensor array module 2020, a camera module CAM, a display panel DPNN, a battery, etc. The housing case HSC may have an upper surface that is opened, and the display panel DPNN may be disposed to occupy the upper surface of the housing case HCS. A USB terminal and a headset or earphone terminal 2040 may be formed at a bottom portion of the housing case HCS. Various elements such as a system on chip SOC may be integrated on the main board 2010.

In addition, the housing case HCS may include a gas entry aperture 2050. The sensor array module 2020 may include one or more gas sensors according to an example embodiment. The sensor array module may be disposed in a first internal space of the housing case HCS. The main board 2010 may be disposed in a second internal space of the housing case HCS, and may be connected to the sensor array module 2020 through a connector CNN2. The first internal space and the second internal space may be blocked from each other by a partition wall 2030. The gas sensor in the sensor array module 2020 may include a heater having the structure of a closed conduction loop as described above.

The main board 2010, the camera module CAM, and the battery BATTERY may be mounted in the housing case HCS. The camera module CAM may be electrically connected to the main board 2010 through a connector CNN1. Various components may be integrated on the main board 2010, for example a system on chip SOC.

Figure 28:
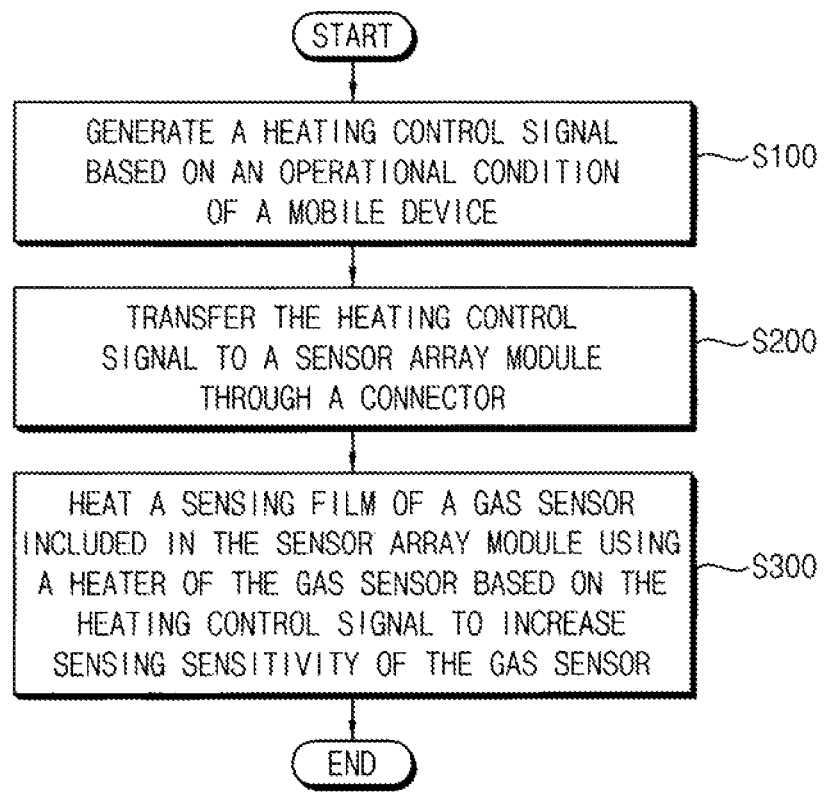
FIG. 28 is a flow chart illustrating a method of operating a mobile device according to an example embodiment.

FIG. 28 is a flow chart illustrating a method of operating a mobile device according to an example embodiment.

Referring to FIGS. 27 and 28, the processor (e.g., the SOC) mounted on the main board 2010 may generate a heating control signal based on an operational condition of the mobile device 2000 (S100).

The processor may transfer the heating control signal to the sensor array module 2020 through the connector CNN2 (S200).

The sensor array module 2020 may heat the sensing film of the gas sensor included in the sensor array module 2020 using the heater of the gas sensor based on the heating control signal to increase sensing sensitivity of the gas sensor (S300).

According to example embodiments, the processor may set the operation conditions as follows, and the processor may activate the heating control signal when one or more of the following operational conditions is satisfied:

1. when the sensing sensitivity of the gas sensor is lowered blow a reference sensitivity;
2. when a predetermined time is elapsed after the gas sensor start being driven;
3. when the mobile device including is not used by a user for a predetermined time duration;

4. at a predetermined time (e.g., an expected time when a user is sleeping);

5. when the mobile device is charged.

Figure 29:
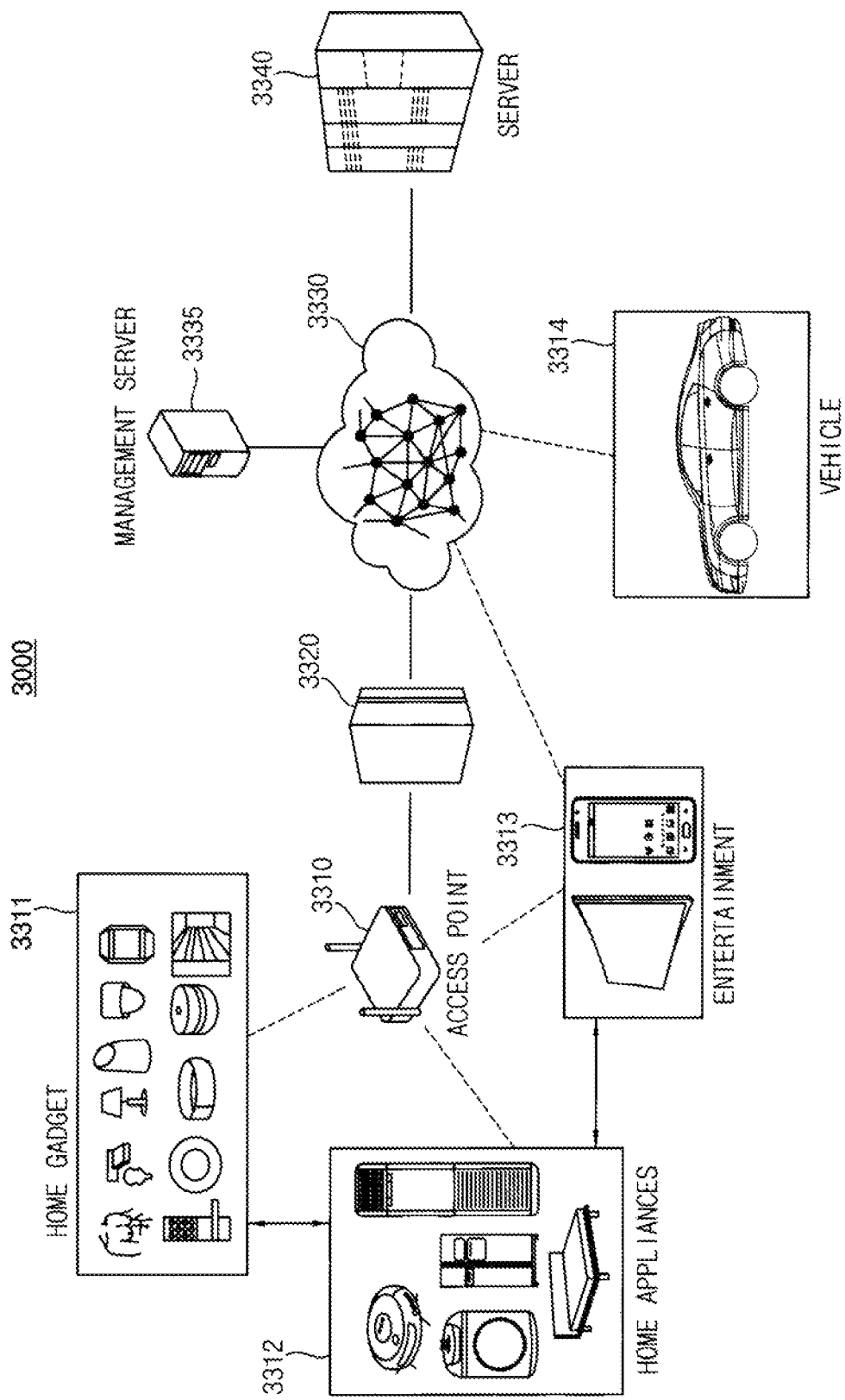
FIG. 29 is a diagram illustrating an Internet of Things (IoT) network system according to an example embodiment.

FIG. 29 is a diagram illustrating an Internet of Things (IoT) network system according to an example embodiment.

Referring to FIG. 29, an IoT network system 3000 may include entities including the gas sensor or a sensor array module described above with reference to FIGS. 1 through 28. As shown in FIG. 29, the IoT network system 3000 may include a plurality of IoT devices 3311, 3312, 3313, and 3314.

Internet of things (IoT) may denote a network of objects using wired and/or wireless communication, and may be referred to as an IoT network system, a ubiquitous sensor network (USN) communication system, a machine type communication (MTC) system, a machine oriented communication (MOC) system, a machine to machine (M2M) communication system, a device to device (D2D) communication system, or the like. For example, the IoT network system 3000 may include an IoT device, an access point, a gateway, a communication network, a server, and the like. Further, the IoT network system 3000 may use a transmission protocol, such as user datagram protocol (UDP) and transmission control protocol (TCP), and an application protocol, such as IPv6 low-power wireless personal area networks (6LoWPAN) protocol, IPv6 internet routing protocol, constrained application protocol (CoAP), hypertext transfer protocol (HTTP), message queue telemetry transport (MQTT), and MQTT for sensors networks (MQTT-S), to exchange information between two or more components in the IoT network system.

In a wireless sensor network (WSN), each of the plurality of IoT devices 3311, 3312, 3313, and 3314 may be used as a sink node or a sensor node. The sink node may be referred to as a base station. The sink node may serve as a gateway for connecting the WSN to an external network (e.g., the Internet) and may assign a task to each sensor node and collect events detected by each sensor node. The sensor node may be a node in the WSN that may perform processing and gathering of sensory information, and may perform communication between nodes connected to each other in the WSN. In an example embodiment, the gas sensor described above with reference to the drawings may be included in the sensor node.

The plurality of IoT devices 3311, 3312, 3313, and 3314 may include an active IoT device that operates using its own power, and a passive IoT device that operates by power externally applied wirelessly. The active IoT device may include, e.g., a refrigerator, an air-conditioner, a telephone, an automobile, and the like, and the passive IoT device may include, e.g., a radio frequency identification (RFID) tag or an NFC tag. In an example embodiment, the IoT devices 3311, 3312, 3313, and 3314 may include passive communication interfaces such as a QR code, an RFID tag, and an NFC tag, or may include active communication interfaces such as a modem and a transceiver. Each of the plurality of IoT devices 3311, 3312, 3313, and 3314 may collect data by using a sensor such as the gas sensor described above with reference to the drawings, or transmit the collected data, e.g., status information, to the outside via a wired and/or wireless communication interface and may transmit and/or receive control information and/or data via a wired and/or wireless communication interface.

In an example embodiment, each of the IoT devices 3311, 3312, 3313, and 3314 may form a group according to the characteristics of each IoT device. For example, the IoT devices 3311, 3312, 3313, and 3314 may be grouped into a home gadget group, a home appliance/furniture group, an entertainment group, or a vehicle group, and each of the IoT devices 3311, 3312, 3313, and 3314 may be included in a plurality of groups in common. For example, the home gadget group (e.g., the IoT device 3311) may include a heart rate sensor patch, a blood glucose measuring device, a lighting device, a hygrometer, a surveillance camera, a smart watch, a security keypad, a temperature controller, a directional device, a window blind, and the like. The home appliance/furniture group (e.g., the IoT device 3312) may include home appliances such as a robot cleaner, a washing machine, a refrigerator, an air conditioner, an air purifier, and a television and furniture such as a bed including a sensor. The entertainment group (e.g., the IoT device 3313) may include a multimedia imaging device such as a television and a smart phone, and a communication device.

The IoT network system 3000 may further include an access point 3310. The plurality of IoT devices 3311, 3312, and 3313 may be connected to a communication network through the access point 3310 or may be connected to other IoT devices through the access point 3310. In an example embodiment, the access point 3310 may be embedded in one IoT device. For example, the access point 3310 may be embedded in a television and a user may monitor or control at least one IoT device, connected to the access point 3310, via a display of the television. Also, the access point 3310 may be included in a mobile phone, and the mobile phone may function as an IoT device and as the access point 3310 connected to other IoT devices and may be connected to a communication network through a mobile communication network or a local area wireless network.

The IoT network system 3000 may further include a gateway 3320. The gateway 3320 may change a protocol to connect the access point 3310 to an external communication network (e.g., the Internet network or a public communication network). The IoT devices 3311, 3312, and 3313 may be connected to an external communication network through the gateway 320. In an example embodiment, the gateway 320 may be integrated into the access point 3310. In other cases, the access point 3310 may function as a first gateway and the gateway 3320 may function as a second gateway. In an example embodiment, the gateway 3320 may be included in one of the IoT devices 3311, 3312, and 3313 and a mobile phone may function as an IoT device and as the gateway 3320 connected to other IoT devices.

The IoT network system 3000 may further include at least one communication network 3330. For example, the communication network 3330 may include the Internet and/or a public communication network, and the public communication network may include a mobile cellular network. The communication network 3330 may provide a channel through which information collected by the IoT devices 3311, 3312, 3313, and 3314 is transmitted.

The IoT network system 3000 may further include a server 3340 and a management server 3335 connected to the communication network 3330. The communication network 3330 may transmit data sensed by the IoT devices 3311, 3312, 3313, and 3314 to the server 3340. The server 3340 may store or analyze the data received through the communication network 3330 and may transmit analyzed results through the communication network 3330. The server 3340 may store information associated with at least one of the IoT devices 3311, 3312, 3313, and 3314 and may analyze data, transmitted from a related IoT device, based on the stored information.

As described above, the gas sensor according to an example embodiment may efficiently heat a sensing material without increasing a size of the gas sensor using the heater having the symmetric structure that is integrated with the resonator on the upper surface of the piezoelectric substrate. The gas sensor may efficiently prevent degeneration of the gas sensor with low power consumption through local heating of the sensing material, and thus performance of the gas sensor and the device/system including the gas sensor may be enhanced.

Embodiments may be applied generally to semiconductor integrated circuits, and more particularly gas sensors and any electronic devices and systems including the gas sensor. For example, embodiments may be applied to systems such as a mobile phone, a smart phone, a personal digital assistant (PDA), a portable multimedia player (PMP), a digital camera, a camcorder, a personal computer (PC), a server computer, a workstation, a laptop computer, a digital TV, a set-top box, a portable game console, a navigation system, a wearable device, an internet of things (IoT) device, an internet of everything (IoE) device, an e-book, a virtual reality (VR) device, an augmented reality (AR) device, etc.

By way of summation and review, a gas sensor may include a gas sensing device that senses gas according to various principles, and the gas sensing device may have an exposed surface for sensing gas. Sensitivity of the gas sensing device may vary due to humidity, heat, and gas accumulation amount applied to the gas sensing device during use of the gas sensor, and accordingly the accuracy of the gas sensor may be reduced.

As described above, example embodiments may provide a gas sensor capable of efficiently enhancing a sensing sensitivity, a sensor array module, and a mobile device including the gas sensor.

A gas sensor according to an embodiment may efficiently heat a sensing material without increasing the size of the gas sensor. The gas sensor may include a heater having a symmetric structure that is integrated with a resonator on an upper surface of a piezoelectric substrate. The gas sensor may efficiently prevent degeneration of the gas sensor with low power consumption through local heating of the sensing material, and thus performance of the gas sensor and the device/system including the gas sensor may be enhanced.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. A gas sensor, comprising:
a piezoelectric substrate;
a resonator in an electrode region on an upper surface of the piezoelectric substrate, the resonator including interdigital transducer (IDT) electrodes and IDT pads connected to the IDT electrodes, the IDT electrodes configured to generate a surface acoustic wave in a center region of the electrode region, the surface acoustic wave propagating in a first horizontal direction;
a sensing film in the center region of the electrode region on the upper surface of the piezoelectric substrate, the sensing film including a sensing material that interacts with a target gas; and
a heater in an edge region surrounding the electrode region on the upper surface of the piezoelectric substrate, the heater including heater electrodes configured to heat the sensing film and heater pads connected to the heater electrodes, the heater electrodes and the heater pads forming a closed conduction loop.

2. The gas sensor as claimed in claim 1, wherein:
the heater is symmetric with respect to a first center line passing through the center region of the electrode region and extending in the first horizontal direction, and
the heater is symmetric with respect to a second center line passing through the center region of the electrode region and extending in a second horizontal direction perpendicular to the first horizontal direction.

3. The gas sensor as claimed in claim 2, wherein the heater electrodes include a plurality of zigzag patterns, each zigzag pattern of the plurality of zigzag patterns including:
at least three column conduction lines extending in the second horizontal direction and arranged adjacent to each other in the first horizontal direction;
a first row conduction line that connects a first end of a first one of the at least three column conduction lines to a first end of a second one of the at least three column conduction lines; and
a second row conduction line that connects a second end of the second one of the at least three column conduction lines to a second end of a third one of the at least three column conduction lines.

4. The gas sensor as claimed in claim 3, wherein a line pitch in the first horizontal direction between two adjacent column conduction lines is uniform with respect to all column conduction lines included in each zigzag pattern of the plurality of zigzag patterns.

5. The gas sensor as claimed in claim 3, wherein each zigzag pattern of the plurality of zigzag patterns includes:
a main zigzag pattern disposed adjacent to the center region of the electrode region, the main zigzag pattern generating a first amount of heat per unit area; and
a sub zigzag pattern disposed farther from the center region of the electrode region than the main zigzag pattern is from the center region, the sub zigzag pattern generating a second amount of heat per unit area, the second amount of heat per unit area being less than the first amount of heat per unit area.

6. The gas sensor as claimed in claim 5, wherein a first line pitch in the first horizontal direction between two adjacent column conduction lines included in the main zigzag pattern is smaller than a second line pitch in the first horizontal direction between two adjacent column conduction lines included in the sub zigzag pattern.

7. The gas sensor as claimed in claim 5, wherein a first line width of each column conduction line included in the main zigzag pattern is smaller than a second line width of each column conduction line included in the sub zigzag pattern.

8. The gas sensor as claimed in claim 2, wherein:
the electrode region includes a first pad region and a second pad region, the first pad region and the second pad region being disposed respectively adjacent to opposite sides of the center region of the electrode region along the second center line such that the electrode region has a cross shape, and the IDT pads are in the first pad region and the second pad region.

9. The gas sensor as claimed in claim 8, wherein the heater pads are adjacent to a side of the first pad region along the second center line and a side of the second pad region along the second center line, or the heater pads are adjacent to opposite sides of the electrode region along the first center line.

10. The gas sensor as claimed in claim 8, wherein the heater electrodes include:
   first and second zigzag patterns disposed respectively adjacent to opposite sides of the first pad region in the first horizontal direction; and
   third and fourth zigzag patterns disposed respectively adjacent to opposite sides of the second pad region in the first horizontal direction.

11. The gas sensor as claimed in claim 10, wherein each of the first through fourth zigzag patterns includes:
   at least three column conduction lines extending in the second horizontal direction and arranged adjacent to each other in the first horizontal direction;
   a first row conduction line that connects a first end of a first one of the at least three column conduction lines to a first end of a second one of the at least three column conduction lines; and
   a second row conduction line that connects a second end of the second one of the at least three column conduction lines to a second end of a third one of the at least three column conduction lines.

12. The gas sensor as claimed in claim 10, wherein each of the first through fourth zigzag patterns includes:
   a main zigzag pattern disposed adjacent to the center region of the electrode region, the main zigzag pattern generating a first amount of heat per unit area; and
   a sub zigzag pattern disposed farther from the center region of the electrode region than the main zigzag pattern, the sub zigzag pattern generating a second amount of heat per unit area, the second amount of heat per unit area being less than the first amount of heat per unit area.

13. The gas sensor as claimed in claim 2, wherein:
   the electrode region includes a first pad region and a second pad region, the first pad region and the second pad region corresponding to opposite end portions of the electrode region along the first center line such that the electrode region has a rod shape extending in the first horizontal direction, and
   the IDT pads are in the first pad region and the second pad region.

14. The gas sensor as claimed in claim 1, wherein the heater electrodes include first and second zigzag patterns disposed respectively adjacent to opposite sides of the electrode region in a second horizontal direction perpendicular to the first horizontal direction.

15. The gas sensor as claimed in claim 14, wherein:
   the first zigzag pattern includes:
      a first main zigzag pattern disposed adjacent to a first side of the center region of the electrode region in the second horizontal direction, the first main zigzag pattern generating a first amount of heat per unit area; and
      first and second sub zigzag patterns disposed respectively adjacent to opposite sides of the first main zigzag pattern in the first horizontal direction, the first and second sub zigzag patterns generating a second amount of heat per unit area, the second amount of heat per unit area being less than the first amount of heat per unit area, and
   the second zigzag pattern includes:
      a second main zigzag pattern disposed adjacent to a second side of the center region of the electrode region in the second horizontal direction, the second main zigzag pattern generating the first amount of heat per unit area; and
      third and fourth sub zigzag patterns disposed respectively adjacent to opposite sides of the second main zigzag pattern in the first horizontal direction, the third and fourth sub zigzag patterns generating the second amount of heat per unit area.

16. The gas sensor as claimed in claim 1, wherein the resonator and the heater are formed in a same conduction layer on the upper surface of the piezoelectric substrate.

17. A sensor array module, comprising:
   a base substrate;
   a driving circuit chip on the base substrate; and
   a plurality of gas sensors on the driving circuit chip, each gas sensor of the plurality of gas sensors including:
      a piezoelectric substrate;
      a resonator in an electrode region on an upper surface of the piezoelectric substrate, the resonator including interdigital transducer (IDT) electrodes and IDT pads connected to the IDT electrodes, the IDT electrodes configured to generate a surface acoustic wave in a center region of the electrode region, the surface acoustic wave propagating in a first horizontal direction;
      a sensing film in the center region of the electrode region on the upper surface of the piezoelectric substrate, the sensing film including a sensing material that interacts with a target gas; and
      a heater in an edge region surrounding the electrode region on the upper surface of the piezoelectric substrate, the heater including heater electrodes configured to heat the sensing film and heater pads connected to the heater electrodes, the heater electrodes and the heater pads forming a closed conduction loop.

18. The sensor array module as claimed in claim 17, further comprising a temperature sensor and a humidity sensor on the driving circuit chip, each of the temperature sensor and the humidity sensor including a heater having a same structure as the heaters included in the plurality of gas sensors,
   wherein the driving circuit chip is configured to drive the heaters of the plurality of gas sensors, the temperature sensor, and the humidity sensor simultaneously to implement a same temperature condition with respect to the plurality of gas sensors, the temperature sensor, and the humidity sensor.

19. A mobile device, comprising:
   a housing case including a gas entry aperture;
   a sensor array module including at least one gas sensor, the sensor array module being in a first internal space of the housing case;
   a main board in a second internal space of the housing case;
   a connector configured to connect the sensor array module and the main board; and a partition wall configured to block the first internal space from the second internal space, the at least one gas sensor including:
a piezoelectric substrate;
a resonator in an electrode region on an upper surface of the piezoelectric substrate, the resonator including interdigital transducer (IDT) electrodes and IDT pads connected to the IDT electrodes, the IDT electrodes configured to generate a surface acoustic wave in a center region of the electrode region, the surface acoustic wave propagating in a first horizontal direction;
a sensing film in the center region of the electrode region on the upper surface of the piezoelectric substrate, the sensing film including a sensing material that interacts with a target gas; and
a heater in an edge region surrounding the electrode region on the upper surface of the piezoelectric substrate, the heater including heater electrodes configured to heat the sensing film and heater pads connected to the heater electrodes, the heater electrodes and the heater pads forming a closed conduction loop.

20. The mobile device as claimed in claim 19, further comprising a processor on the main board, the processor configured to generate a heating control signal based on an operational condition of the mobile device to transfer the heating control signal to the sensor array module through the connector,
wherein the sensor array module heats the sensing film of the at least one gas sensor using the heater based on the heating control signal to increase sensing sensitivity of the at least one gas sensor.

* * * * *